US008953490B2

(12) United States Patent
Montemurro et al.

(10) Patent No.: US 8,953,490 B2
(45) Date of Patent: Feb. 10, 2015

(54) METHODS AND APPARATUS FOR USE IN FACILITATING WI-FI PEER-TO-PEER (P2P) WIRELESS NETWORKING

(75) Inventors: Michael Peter Montemurro, Toronto (CA); Constantin Adrian Sandu, Cambridge (CA)

(73) Assignee: Blackberry Limited, Waterloo, Ontario (CA)

( * ) Notice: Subject to any disclaimer, the term of this patent is extended or adjusted under 35 U.S.C. 154(b) by 188 days.

(21) Appl. No.: 13/410,734

(22) Filed: Mar. 2, 2012

(65) Prior Publication Data

US 2013/0229944 A1 Sep. 5, 2013

(51) Int. Cl.
*H04W 40/24* (2009.01)

(52) U.S. Cl.
USPC .......................................... 370/254; 370/239

(58) Field of Classification Search
USPC .................................. 370/254, 329
See application file for complete search history.

(56) References Cited

U.S. PATENT DOCUMENTS

| 7,886,064 | B2 | 2/2011 | Nomura et al. |
|---|---|---|---|
| 7,924,785 | B2 | 4/2011 | Shaheen et al. |
| 7,957,357 | B2 | 6/2011 | Tysowski et al. |
| 2005/0148299 | A1 | 7/2005 | Buckley |
| 2005/0232209 | A1 | 10/2005 | Buckley et al. |
| 2005/0278646 | A1 | 12/2005 | Liscano et al. |
| 2006/0217147 | A1 | 9/2006 | Olvera-Hernandez et al. |
| 2007/0064650 | A1 | 3/2007 | Lohtia et al. |
| 2007/0094279 | A1 | 4/2007 | Mittal et al. |
| 2008/0207129 | A1 | 8/2008 | Page et al. |
| 2009/0011773 | A1 | 1/2009 | Balachandran et al. |
| 2009/0175207 | A1 | 7/2009 | Stephenson et al. |
| 2009/0222517 | A1* | 9/2009 | Kalofonos et al. ............. 709/204 |
| 2009/0279492 | A1* | 11/2009 | Montemurro et al. ........ 370/329 |
| 2009/0303926 | A1 | 12/2009 | Den Hartog et al. |

(Continued)

FOREIGN PATENT DOCUMENTS

| WO | 2004031488 A1 | 4/2004 |
|---|---|---|
| WO | WO2011/039718 | * 9/2010 |

(Continued)

OTHER PUBLICATIONS

"Wi-Fi peer-to-peer technical specification 2010, pp. 1-159 vol. 1.1".*

(Continued)

*Primary Examiner* — Dang Ton
*Assistant Examiner* — Mewale Ambaye
(74) *Attorney, Agent, or Firm* — Perry + Currier Inc.

(57) ABSTRACT

A wireless communication device is configured to store a plurality of profiles associated with applications. Each profile includes at least a discovery mode property and a device type property. In response to an application being activated, the wireless device enables a discovery mode for performing discovery in accordance with the discovery mode property retrieved from a selected profile associated with the application. When one or more devices are available for discovery, the wireless device receives information from each device, filters the received information to provide filtered information associated with one or more devices having a device type that matches the device type property, and provides the filtered information to the application. The wireless device may then establish, in accordance with one or more properties retrieved from the selected profile, a Wi-Fi P2P wireless network connection with at least one of the devices.

23 Claims, 12 Drawing Sheets

(56) References Cited

U.S. PATENT DOCUMENTS

| | | |
|---|---|---|
| 2010/0005513 A1 | 1/2010 | Bradley et al. |
| 2010/0121934 A1 | 5/2010 | Guntupalli et al. |
| 2011/0082939 A1 | 4/2011 | Montemurro et al. |
| 2011/0082940 A1 | 4/2011 | Montemurro et al. |
| 2011/0149789 A1 | 6/2011 | Edge |
| 2011/0149806 A1 | 6/2011 | Verma et al. |
| 2011/0280233 A1 | 11/2011 | Choi et al. |
| 2011/0310875 A1 | 12/2011 | Tysowski et al. |
| 2012/0076118 A1 | 3/2012 | Montemurro et al. |

FOREIGN PATENT DOCUMENTS

| | | |
|---|---|---|
| WO | 2011039718 A1 | 4/2011 |
| WO | 2012006446 A1 | 1/2012 |

OTHER PUBLICATIONS

"Wi-Fi Peer-to-Peer (P2P) Technical Specification" Wi-Fi Alliance; Draft Version 1.14; Jun. 25, 2010; Retrieved from: http:l/www.slide:share.net/latex3elwifi.p2p.technical.specification-draft-v114.*

"What Is Wi-Fi Direct and How Do I Use It on My T-Mobile SGH-t989 Galaxy S II Mobile Device", Dec. 19, 2011, pp. 1-8, http://www.samsung.com/us/support/supportownershowtoguidepopup.do?howto_guide.

"Wi-Fi Peer-to-Peer (P2P) Technical Specification", 2010, pp. 1-159, vol. 1.1.

"Wi-Fi Direct Mode", Dec. 19, 2011, pp. 1-2, http://www.sony-asia.com/microsite/bravia_i-manuals/FY11/GA/eng/HX920_DS/nt_wfd.

"Broadcom Selected for Wi-Fi Certified Wi-Fi Direct Test Suite and Among the First to Obtain Certification", Dec. 19, 2011, pp. 1-3, http://www.prnewswire.com/news-releases/broadcom/-selected-for-wi-fi-certified-wi-fi-direct.

"Wi-Fi Certified Wi-Fi Direct, Frequently Asked Questions", Oct. 19, 2009, pp. 1-4.

U.S. Appl. No. 13/087,752, filed Apr. 15, 2011.

"Wi-Fi Peer-to-Peer (P2P) Technical Specification" Wi-Fi Alliance; Draft Version 1.14; Jun. 25, 2010; Retrieved from: http://www.slide:share.net/latex3e/wifi.p2p.technical.specification-draft-v114.

"Bluetooth Specification Core version 4.0", Bluetooth Special Interest Group; Jun. 30, 2010; Version 4.0; vol. 3; p. 274-406; Retrieved from: https:/lwww.bluetooth.org/en-us/specification/adopted-specifications.

Wi-Fi Alliance Member Symposium—, China, Apr. 2011; pp. 103-171; Retrieved from: http://www.wi-fi.org/files/20110421_China_Symposia_full_merge.pdf.

PCT International Application No. PCT/CA2013/050153 International Search Report dated May 14, 2013.

PCT International Application No. PCT/CA2013/050153 Written Opinion of the International Searching Authority dated May 14, 2013.

Bluetooth SIG Imaging Working Group: "Basic Imaging Profile. Interoperability Specification", Internet Citation, Jul. 25, 2003, XP007900617, Retrieved from the Internet: URL:http://www.bluetooth.com/NR/rdonlyres/182CCD92-3481-44FO-B901-9181BE573AFA/924/BIP Spec VIO. pdf [retrieved on May 15, 2006] p. 79-p. 84.

European Patent Application No. 12157873.6 Search Report dated Aug. 20, 2012.

* cited by examiner

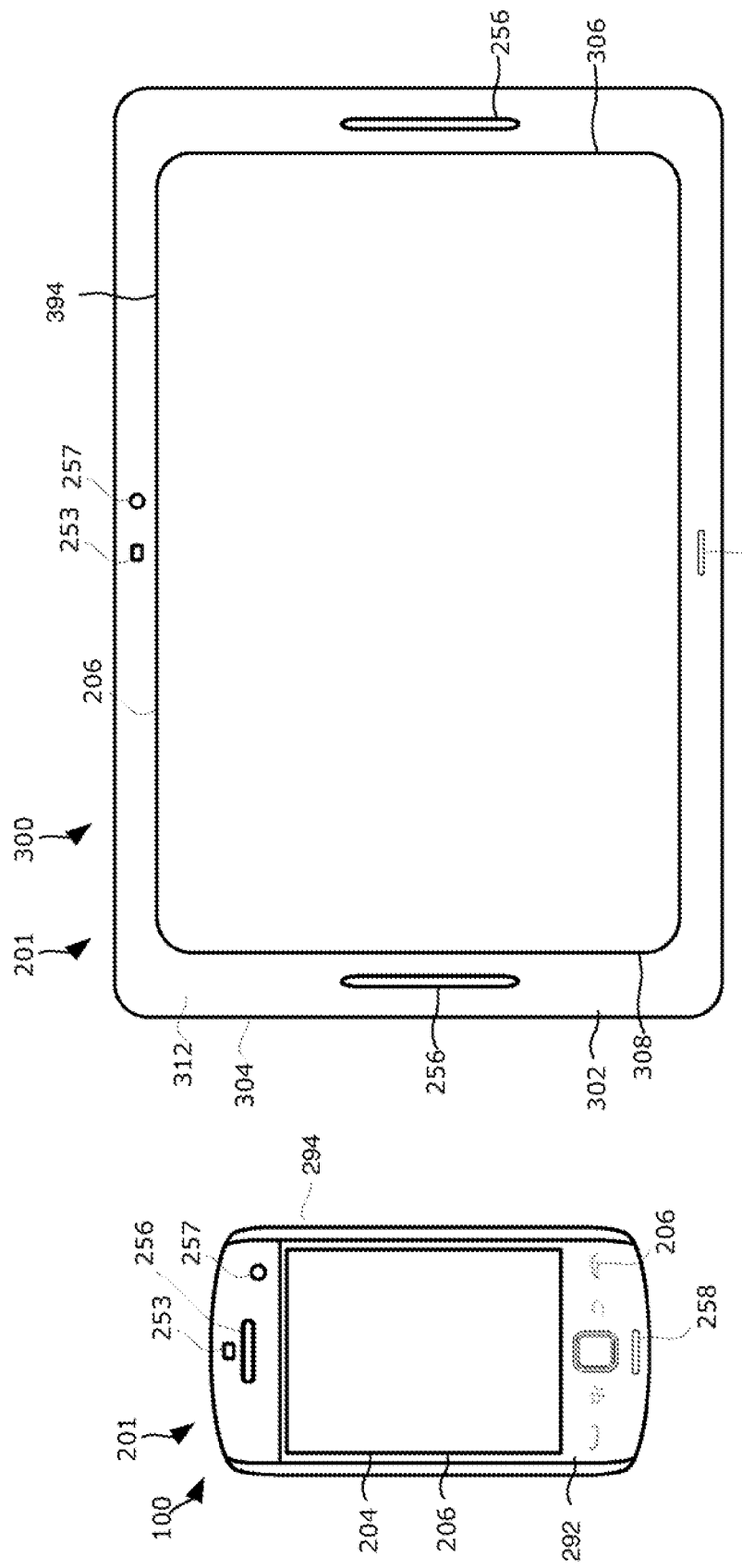

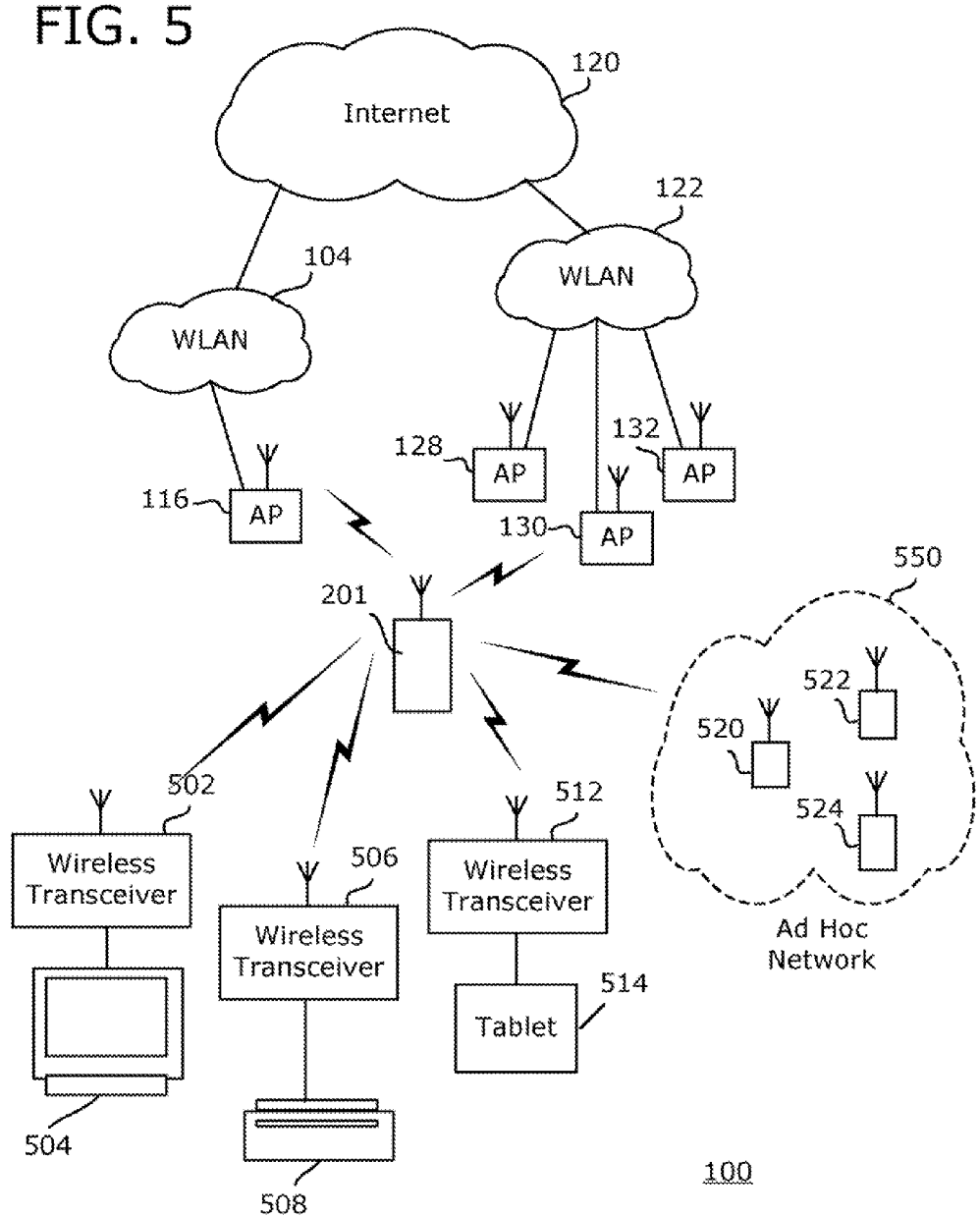

METHODS AND APPARATUS FOR USE IN FACILITATING WI-FI PEER-TO-PEER (P2P) WIRELESS NETWORKING

BACKGROUND

1. Field of the Technology

The present disclosure relates generally to communication devices configured for wireless communications, and more particularly to techniques for facilitating Wi-Fi peer-to-peer (P2P) wireless communications for such devices.

2. Description of the Related Art

A wireless communication device, such as a portable battery-powered wireless telephony device, may be configured to communicate in wireless communication networks. For example, such a device may communicate via access points (APs) of wireless local area networks (WLANs) in accordance with IEEE 802.11 standards or the like. Such a device may additionally or alternatively communicate using peer-to-peer communication techniques, for example, in accordance with the Wi-Fi Peer-To-Peer (P2P) Technical specification, and/or be certified as a "Wi-Fi Direct" device.

There is a need for efficiently facilitating Wi-Fi P2P wireless networking in these and similar environments.

BRIEF DESCRIPTION OF THE DRAWINGS

Embodiments of present disclosure will now be described by way of example with reference to attached figures, wherein:

FIGS. 3 and 4 are some examples of different types of wireless devices of the present disclosure, which include a smartphone (FIG. 3) and a tablet computer (FIG. 4);

FIG. 5 is an illustrative representation of a part of the communication system of 5 FIG. 1 with different types of wireless networks, including different types of Wi-Fi peer-to-peer (P2P) wireless networks associated with different applications;

DETAILED DESCRIPTION OF THE PREFERRED EMBODIMENTS

Techniques for use in facilitating Wi-Fi peer-to-peer (P2P) wireless communications are described herein. A wireless communication device is configured to store a plurality of profiles associated with applications. Each profile includes at least a discovery mode property and a device type property. In response to an application being activated, the wireless device enables a discovery mode for performing discovery in accordance with the discovery mode property retrieved from a selected profile associated with the application. When one or more devices are available for discovery, the wireless device receives information from each device, filters the received information to provide filtered information associated with one or more devices having a device type that matches the device type property, and provides the filtered information to the application. The wireless device then establishes, in accordance with one or more properties retrieved from the selected profile, a Wi-Fi P2P wireless network connection with at least one of the devices. The Wi-Fi P2P wireless network connection may be established in accordance with the Wi-Fi Peer-To-Peer (P2P) Technical specification. Different profiles may be enabled concurrently, where discovery in relation to both profiles is performed at the same time.

Example Environment

Figure 1:
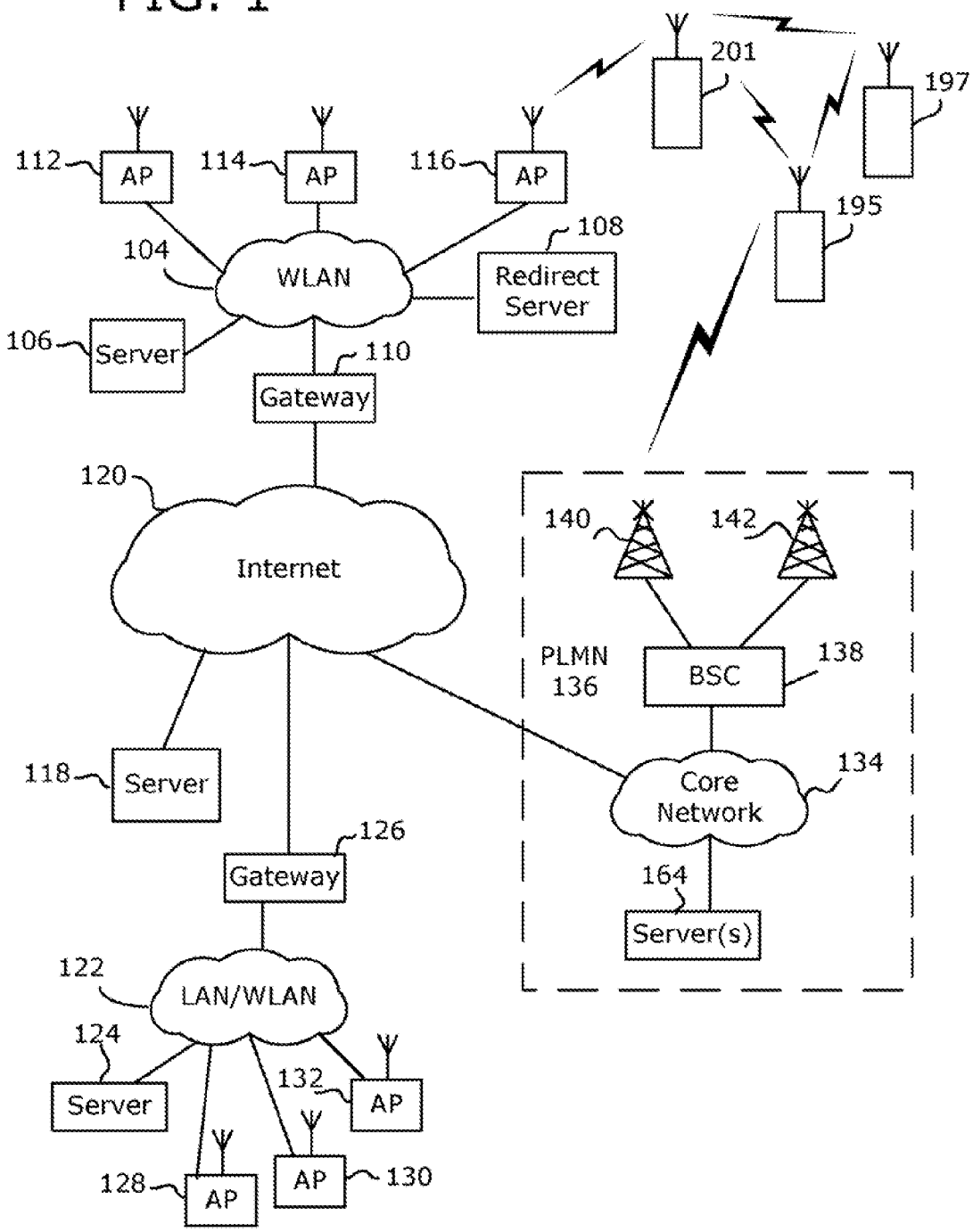
FIG. 1 is an illustrative representation of a communication system which includes wireless communication networks (e.g. WLANs) through which a wireless communication device may communicate.

To illustrate one environment within which the techniques of the present disclosure may be practiced, FIG. 1 illustrates a wireless communication device 201 which may communicate in a communication system 100. In the communication system 100, wireless device 201 may communicate with one or more wireless communication networks. For example, wireless device 201 may communicate with a wireless communication network 104 which is a wireless local area network (WLAN). Here, wireless network 104 and wireless device 201 may operate in accordance with IEEE 802.11 standards.

In this example, wireless network 104 has a plurality of wireless access points (APs) 112, 114, and 116 for wireless communications with wireless device 201. WLANs may be identified by a wireless device 201 with use of a wireless network identifier which is communicated from the WLAN. The wireless network identifier may be, for example, a Set Service Identifier (SSID) or Extended SSID (ESSID). In this example, wireless network 104 includes one or more servers 106, a redirect server 108, and a gateway 110. Server 106 may provide data, applications, and/or functionality for communication services for wireless device 201.

Wireless network 104 may be a public Wi-Fi "hotspot" for public use, and include what may be referred to as a "captive portal" or "walled garden." For devices connected in wireless network 104 via one of wireless APs 112, 114, and 116, gateway 110 is configured to permit or deny access to the data, applications, and/or functionality, as well as to permit or deny external access outside of wireless network 104 to Internet 120. To do this, gateway 110 has a set of IP address filters which define a set of addresses that are permissible/impermissible, if any at all, for access by devices. Access by a device depends on whether or not a device has been authorized and what access rights are given upon authorization.

Typically, when a request by a device in wireless network 104 is made prior to proper authorization, gateway 110 is configured to redirect the request to redirect server 108. In response, redirect server 108 is configured to respond to wireless device 201 to provide data for producing information (e.g. Web page information) which is rendered in a visual display of wireless device 201 via a Web browser application. The information may solicit a user response. For example, the information may solicit a user registration or login with user fields for entering a user name and/or password information. Gateway 110 identifies whether the received user response is sufficient (e.g. whether the user name and password match prestored user name and password information, whether the user payment is accepted, whether the user acceptance is confirmed, etc.). If the user response is deemed sufficient, gateway 110 permits access to the data, applications, and/or functionality in or outside of wireless network 104.

Wireless device 201 may also operate for communications in other different wireless networks, such as a wireless network 122 which is also a WLAN. In this example, wireless network 122 is a private communication network of an enterprise (e.g. an organization, a company, a corporation, etc.) of wireless device 201. Similar to wireless network 104, wireless network 122 has a plurality of wireless APs 128, 130 and 132, one or more servers 124, and a gateway 126. For devices connected in wireless network 122 via one of wireless APs 128, 130, and 132, gateway 126 may be configured to permit or deny access to the data, applications, and/or functionality offered via wireless network 122 depending on whether or not a device has been authorized and what access rights are given upon authorization. For devices attempting to access wireless network 122 via Internet 120, gateway 126 is configured to permit or deny internal access to the data, applications, and/or functionality in wireless network 122.

Such wireless networks (e.g. infrastructure WLANs) may provide or allow access to various data and communication services to its terminals. For example, the wireless networks may provide for communication access to Internet 120 via the Web browser application, or voice telephony communication service with use of Voice over IP (VoIP) communication, or other communication services. For "push-type" data or message synchronization services, for example, wireless device 201 may be enabled to maintain data synchronization with a server (e.g. server 106 or 124) for user data of an application associated with a user account. The application of wireless device 201 and the server may be or include, for example, an electronic mail (e-mail) application program for the communication of e-mail messages.

Wireless device 201 may be additionally configured to access communication services via a Public Land Wireless Network (PLMN) 136 (e.g. a cellular telecommunications network). PLMN 136 includes a core network 134, a plurality of base station controllers such as a base station controller (BSC) 138 coupled to core network 134, and a plurality of base stations such as a base station (BS) 140 and a base station 142 coupled to associated BSCs 138. Core network 134, BSC 138, and BS 140 operate in a conventional fashion as well-documented. Other PLMNs in the environment have a similar or the same architecture as PLMN 136. For communication with PLMNs, wireless device 201 may be configured in accordance with one or more cellular telecommunication standards, such as Global Systems for Mobile (GSM) and/or General Packet Radio Service (GPRS) technologies. However, such wireless device may additionally or alternatively operate in accordance with other such cellular standards, such as Enhanced Data rates for GSM Evolution (EDGE) or Enhanced GPRS (EGPRS), Universal Mobile Telecommunications System (UMTS), Long-Term Evolution (LTE), or EVolution-Data Only (EV-DO) (for CDMA) technologies, as a few examples.

Further, in additional to being operative for communications with infrastructure WLANs (e.g. IEEE 802.11 infrastructure WLANs), wireless device 201 may additionally or alternatively communicate using peer-to-peer communication techniques, for example, in accordance with the Wi-Fi Peer-To-Peer (P2P) Technical specification, and/or be certified as a "Wi-Fi Direct" device.

Accordingly, illustrated further in FIG. 1, wireless device 201 and one or more other wireless devices 195 and 197 in FIG. 1 may be operative to establish Wi-Fi P2P wireless network connections with each other in a Wi-Fi P2P wireless network. Here, one of the communications devices may be configured to enter into an AP mode of operation, so that other communication devices may associate with them for direct RF communications therebetween. An AP mode of operation, which may be referred to as a "wireless AP mode" or the like, provides a benefit due to the high data rates available over WLAN links. Here, again, data may be communicated directly between the wireless devices without the data traversing any wireless network infrastructure, where one of the devices is set to operate or serve as an AP (switching operation from as an end terminal) and the other device operates as an end terminal to associate and connect with the AP (i.e. wireless device 201 operating as an AP) for communications. Wireless device 201 may operate such that, when in the AP mode of operation with other communication devices 195 and 197, it also operates as a client with another AP.

Figure 2:
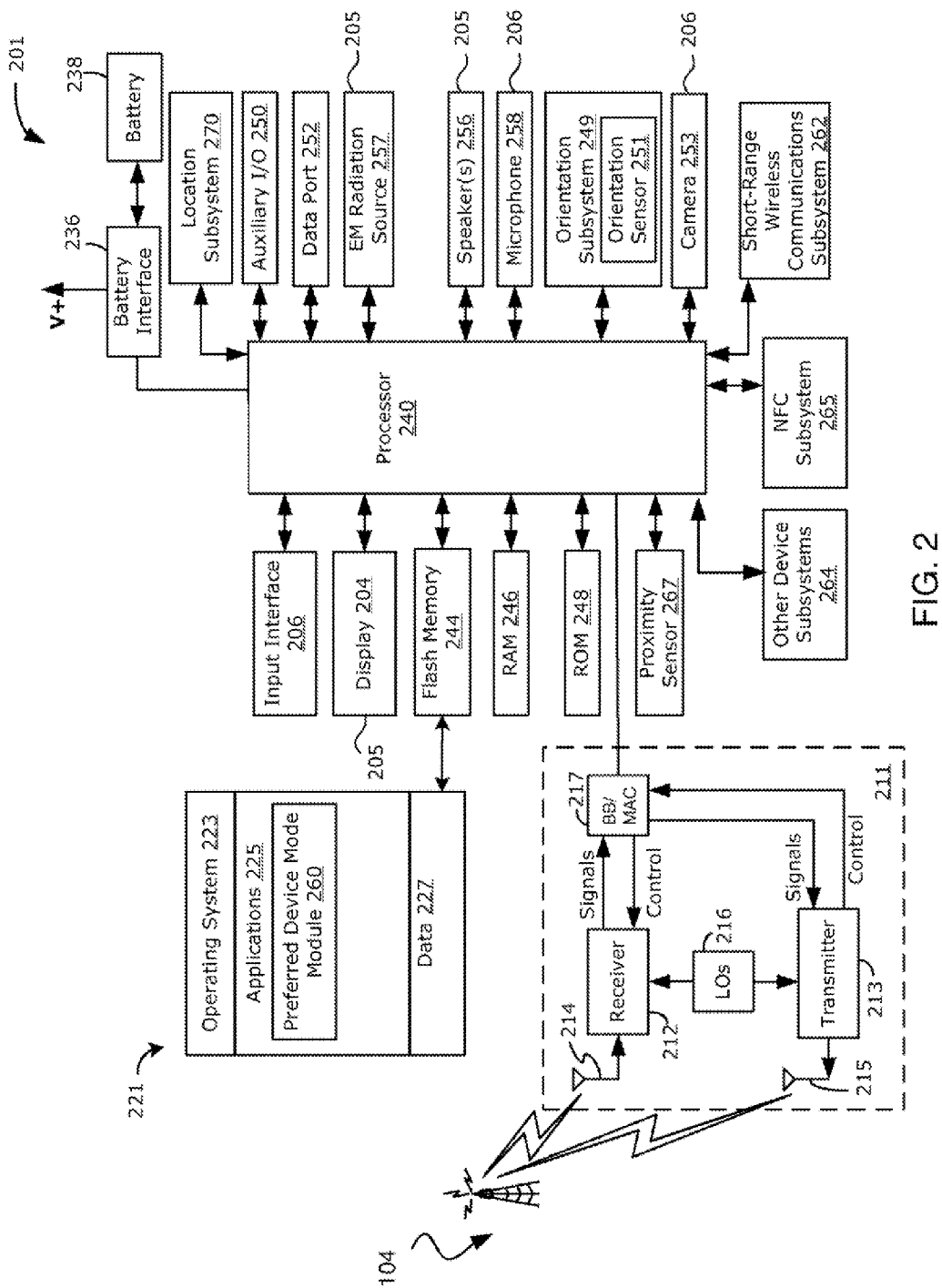
FIG. 2 is an example of a schematic block diagram of a wireless communication device.

Reference will now be made to FIG. 2 which illustrates one example of a schematic block diagram of wireless device 201 in which example embodiments may be applied. In the illustrated example embodiment, wireless device 201 is a communication device and, more particularly, is a mobile communication device having data and voice communication capabilities, and configured to communicate with other computer systems (e.g. via the Internet). It will, however, be appreciated that wireless device 201 may take other forms.

Depending on the functionality provided by wireless device 201, in various example embodiments wireless device 201 may be a multiple-mode communication device configured for both data and voice communication, a mobile telephone, such as a smartphone, a wearable computers such as a watch, a tablet computer such as a slate computer, a personal digital assistant (PDA), or a computer system. Wireless device 201 may take other forms apart from those specifically listed above. The electronic device may also be referred to as a mobile communications device, a communication device, a mobile device and, in some cases, as a device.

Wireless device 201 includes a controller including one or more processor 240 (such as a microprocessor) which controls the overall operation of wireless device 201. The processor 240 interacts with device subsystems such as a wireless communication subsystem 211 for exchanging radio frequency signals with wireless network 104 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touch-screen display 204, an orientation subsystem 249, memory (such as flash memory 244, random access memory (RAM) 246, read only memory (ROM) 248, etc.), auxiliary input/ output (I/O) subsystems 250, a data port 252 (which may be a serial data port, such as a Universal Serial Bus (USB) data port), a near field communications (NFC) subsystem 265, a short-range communication subsystem 262 and other device subsystems generally designated as 264. Some of the subsystems shown in FIG. 2 perform communication-related functions, whereas other subsystems may provide "resident" or on-device functions.

In at least some example embodiments, wireless device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller. In at least some example embodiments, the touch-sensitive overlay may have a touch-sensitive input surface which is larger than the display 204. For example, in at least some example embodiments, the touch-sensitive overlay may extend overtop of a frame 312 (of FIG. 3) which surrounds the display 204. In such example embodiments, the frame 312 (of FIG. 3) may be referred to as an active frame since it is capable of acting as an input interface 206. In at least some example embodiments, the touch-sensitive overlay may extend to the sides of wireless device 201.

As noted above, in some example embodiments, wireless device 201 may include a communication subsystem 211 which allows wireless device 201 to communicate over wireless network 104. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to wireless device 201 and a single antenna may be shared by both receiver and transmitter. The particular design of the wireless communication subsystem 211 depends on wireless network 104 in which wireless device 201 is intended to operate.

In at least some example embodiments, wireless device 201 may communicate with any one of a plurality of stations or access points (APs) of wireless network 104 within its geographic coverage area. Wireless device 201 may send and receive communication signals over wireless network 104 after the required network registration or activation procedures have been completed. Signals received by the antenna 214 through wireless network 104 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to wireless network 104 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some example embodiments, the auxiliary input/output (I/O) subsystems 250 may include an external communication link or interface; for example, an Ethernet connection. Wireless device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on wireless device 201 such as receipt of an electronic communication or incoming phone call, or for other purposes such as haptic feedback (touch feedback).

The data port 252 may be used for synchronization with a user's host computer system (not shown). The data port 252 enables a user to set preferences through an external device or software application and extends the capabilities of wireless device 201 by providing for information or software downloads to wireless device 201 other than through wireless network 104. The alternate download path may for example, be used to load an encryption key onto wireless device 201 through a direct, reliable and trusted connection to thereby provide secure device communication.

In at least some example embodiments, wireless device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some example embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of wireless device 201. The orientation data, in at least some example embodiments, specifies the orientation of the device 201 relative to the gravitational field of the earth.

In some example embodiments, the orientation subsystem 249 may include other orientation sensors 251, instead of or in addition to accelerometers. For example, in various example embodiments, the orientation subsystem 249 may include a gravity sensor, a gyroscope, a tilt sensor, an electronic compass or other suitable sensor, or combinations thereof. In some example embodiments, the device orientation subsystem 249 may include two or more orientation sensors 251 such as an accelerometer and an electronic compass.

Wireless device 201 may, in at least some example embodiments, include a near field communications (NFC) subsystem 265. The NFC subsystem 265 is configured to communicate with other wireless devices 201 and/or tags, using an NFC communications protocol. NFC is a set of short-range wireless technologies which typically require a distance of 4 cm or less for communications. The NFC subsystem 265 may include an NFC chip and an NFC antenna.

Wireless device 201 may include a microphone and/or one or more speakers. In at least some example embodiments, wireless device 201 may include a plurality of speakers 256. For example, in some example embodiments, wireless device 201 may include two or more speakers 265. The two or more speakers 256 may, for example, be disposed in spaced relation to one another. That is, in at least some example embodiments, wireless device 201 may include a first speaker and a second speaker and the first speaker and the second speaker may be spatially separated from one another within wireless device 201. In at least some example embodiments, the display 204 may be disposed between the first speaker and the second speaker of the electronic device. In such example embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display. In at least some example embodiments, each speaker 256 may be associated with a separate audio channel. The multiple speakers may, for example, be used to provide stereophonic sound (which may also be referred to as stereo).

Wireless device 201 may also include one or more cameras 253. The one or more cameras 253 may be capable of capturing images in the form of still photographs or motion video. In at least some example embodiments, wireless device 201 includes a front facing camera 253. A front facing camera is a camera which is generally located on a front side 292 of wireless device 201. The front side 292 is typically the side 292 on which a display 204 is mounted. That is, the display 204 is configured to display content which may be viewed from a side of wireless device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of wireless device 201 and/or the housing of wireless device 201. In such example embodiments, the direction of capture of the camera is always predictable relative to the display 204 and/or the housing. In at least some example embodiments, the camera may be provided in a central location relative to the display 204 to facilitate image acquisition of a side 292.

In at least some example embodiments, wireless device 201 includes an electromagnetic (EM) radiation source 257. In at least some example embodiments, the EM radiation source 257 is configured to emit electromagnetic radiation from the side of the electronic device which is associated with a camera 253 of that wireless device 201. For example, where the camera is a front facing camera 253, wireless device 201 may be configured to emit electromagnetic radiation from the front face of wireless device 201. That is, in at least some example embodiments, the electromagnetic radiation source 257 is configured to emit radiation in a direction which may visible by the camera. That is, the camera 253 and the electromagnetic radiation source 257 may be disposed on wireless device 201 so that electromagnetic radiation emitted by the electromagnetic radiation source 257 is visible in images obtained by the camera.

In some example embodiments, the electromagnetic radiation source 257 may be an infrared (IR) radiation source which is configured to emit infrared radiation. In at least some example embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some example embodiments, the camera 253 is configured to capture at least some electromagnetic radiation which is not in the visible spectrum.

In some example embodiments, wireless device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their wireless device 201 to the host computer system via a USB cable or Bluetooth® connection, traffic that was destined for wireless network 104 is automatically routed to wireless device 201 using the USB cable or Bluetooth® connection. Similarly, any traffic destined for wireless network 104 is automatically sent over the USB cable Bluetooth® connection to the host computer system for processing.

Wireless device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in wireless device 201, and the battery interface 236 provides a mechanical and electrical connection for the battery 238. The battery interface 236 is coupled to a regulator (not shown) which provides a regulated voltage V to the circuitry for powering wireless device 201.

Wireless device 201 includes a short-range communication subsystem 262 which provides for wireless communication between wireless device 201 and other wireless devices 201. The short-range communication subsystem 262 may be used to provide a preferred device mode between wireless device 201 and another wireless device 201 which may, in at least some example embodiments, be a wireless device which is the same or similar to wireless device 201 discussed with reference to FIG. 1. In at least some example embodiments, the short-range communication subsystem 262 is a wireless bus protocol compliant communication mechanism such as a Bluetooth® communication module to provide for communication with similarly-enabled systems and devices.

Wireless device 201 stores data 227 in an erasable persistent memory, which in one example embodiment is the flash memory 244. In various example embodiments, the data 227 includes service data including information required by wireless device 201 to establish and maintain communication with wireless network 104. The data 227 may also include user application data such as email messages, address book and contact information, calendar and schedule information, notepad documents, image files, and other commonly stored user information stored on wireless device 201 by its user, and other data. The data 227 stored in the persistent memory (e.g. flash memory 244) of wireless device 201 may be organized, at least partially, into one or more databases or data stores. The databases or data stores may contain data items of the same data type or associated with the same application. For example, email messages, contact records, and task items may be stored in individual databases within the device memory.

Wireless device 201 may, in some example embodiments, be a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of wireless device 201 may also compose data items, such as email messages; for example, using the input devices in conjunction with the display 204. These composed items may be transmitted through the communication subsystem 211 over wireless network 104.

In the voice communication mode, wireless device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on wireless device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 such as preferred device mode module 260. In the example embodiment of FIG. 1, the preferred device mode module 260 is implemented as a stand-alone application 225. However, in other example embodiments, the preferred device mode module 260 could be implemented as part of the operating system 223 or another application 225.

The software applications 225 on wireless device 201 may also include a range of additional applications, including for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (e.g. the display 204) according to the application.

The software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

A predetermined set of applications that control basic device operations, including data and possibly voice communication applications will normally be installed on wireless device 201 during or after manufacture. Additional applications and/or upgrades to the operating system 223 or software applications 225 may also be loaded onto wireless device 201 through wireless network 104, the auxiliary I/O subsystem 250, the data port 252, the short-range communication subsystem 262, or other suitable subsystem 264. The downloaded programs or code modules may be permanently installed; for example, written into the program memory (i.e. the flash memory 244), or written into and executed from the RAM 246 for execution by the processor 240 at runtime.

Example Smartphone Electronic Device

Referring now to FIG. 3, a front view of an example wireless device 201 which is a smartphone 100 is illustrated. The smartphone 100 is a mobile phone which offers more advanced computing capability than a basic non-smartphone cellular phone. For example, the smartphone 100 may have the ability to execute third party applications which are stored on the smartphone.

The smartphone 100 may include the components discussed above with reference to FIG. 2 or a subset of those components. The smartphone 100 includes a housing 294 which houses at least some of the components discussed above with reference to FIG. 2.

In the example embodiment illustrated, the smartphone includes a display 204, which may be a touchscreen display which acts as an input interface 206. The display 204 is disposed within the smartphone 100 so that it is viewable at a front side 292 of the smartphone 100. That is, a viewable side of the display 204 is disposed on the front side 292 of the smartphone. In the example embodiment illustrated, the display 204 is framed by the housing 294.

The example smartphone 100 also includes other input interfaces 206 such as one or more buttons, keys or navigational input mechanisms. In the example illustrated, at least some of these additional input interfaces 206 are disposed for actuation at the front side 292 of the smartphone.

The example smartphone also includes a speaker 256. In the example embodiment illustrated, the smartphone includes a single speaker 256 which is disposed vertically above the display 204 when the smartphone 100 is held in a portrait orientation where its height is longer than its width. The speaker 256 may be disposed on the front face side 292 of the smartphone 100.

While the example smartphone 100 of FIG. 3 includes a single speaker 256, in other example embodiments, the smartphone 100 may include a greater number of speakers 256. For example, in at least some example embodiments, the smartphone 100 may include a second speaker 256 which is disposed vertically below the display 204 when the smartphone is held in a portrait orientation where its height is longer than its width (i.e. the orientation illustrated in FIG. 3).

The example smartphone 100 also includes a microphone 258. In the example illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The example smartphone 100 also includes a front facing camera 253 which may be located vertically above the display 204 when the smartphone 100 is held in a portrait orientation where its height is longer than its width. The front facing camera 253 is located so that it may capture images of objects which are located in front of and/or surrounding the front side of the smartphone 100.

The example smartphone 100 also includes an electromagnetic radiation source 257. The electromagnetic radiation source 257 is disposed on the front side 292 of the smartphone 100. In this orientation, electromagnetic radiation which is produced by the electromagnetic radiation source 257 may be projected onto objects which are located in front of and/or surrounding the front side of the smartphone 100. Such electromagnetic radiation (or the projection of electromagnetic radiation onto objects) may be captured on images obtained by the camera 253.

Example Tablet Electronic Device

The wireless device may be a tablet computer 300 ("tablet"), one of which is illustrated in FIG. 4. Tablet computer 300 of FIG. 4 may include many of the same features and components of the smartphone 100 of FIG. 3. However, tablet computer 300 of FIG. 3 is generally larger than the smartphone 100 of FIG. 3. Tablet computer 300 may include the components discussed above with reference to FIG. 2 or a subset of those components. Tablet computer 300 includes a housing 394 which houses at least some of the components discussed above with reference to FIG. 2.

Tablet computer 300 includes a display 304, which may be a touchscreen display which acts as an input interface 206. The display 304 is disposed within tablet computer 300 so that it is viewable at a front side 302 of tablet computer 300. That is, a viewable side of the display 304 is disposed on the front side 302 of tablet computer 300. In the example embodiment illustrated, the display 304 is framed by the housing 394, with use of a frame 312 which surrounds the display 304. The frame 312 is portion of the housing 394 which provides a border around the display 304. In at least some example embodiments, the frame 312 is an active frame 312. That is, the frame has a touch sensitive overlay which allows wireless device 201 to detect a touch applied to the frame, thereby allowing the frame 312 to act as an input interface 206 (of FIG. 1).

The example tablet computer 300 includes a plurality of speakers 256. In the example embodiment illustrated, the tablet includes two speakers 256. The two speakers 256 are disposed on opposing sides of the display 304. More particularly, when tablet computer 300 is held in a landscape orientation (such as the orientation illustrated in FIG. 3) where its width is longer than its height, one of the two speakers is disposed on a right side 306 of the display 304 and one of the speakers is disposed on the left side 308 of the display 304. Both speakers 256 are disposed on the front side 302 of tablet computer 300.

The example tablet computer 300 also includes a microphone 258. In the example illustrated, the microphone 258 is vertically disposed below the display 304 when the tablet computer is held in the landscape orientation illustrated in FIG. 4. The microphone 258 may be located in other locations in other example embodiments.

The example tablet computer 300 also includes a front facing camera 253 which may be located vertically above the display 304 when tablet computer 300 is held in a landscape orientation (i.e. the orientation of FIG. 3). The front facing camera 253 is located so that it may capture images of objects which are located in front of and/or surrounding the front side of tablet computer 300.

The example tablet computer 300 also includes an electro-magnetic radiation source 257. The electromagnetic radiation source 257 is disposed on the front side 304 of tablet computer 300. In this orientation, electromagnetic radiation which is produced by the electromagnetic radiation source 257 may be projected onto objects which are located in front of and/or surrounding the front side 302 of tablet computer 300. Such electromagnetic radiation (or the projection of electromagnetic radiation onto objects) may be captured on images obtained by the camera 253.

Although a specific wireless device 201 has just been described, any suitable wireless communication device or terminal may be part of the methods and apparatus which will be described in fuller detail below. Also, although the description of the architecture relates to a specific example for illustration, where the wireless network or WLAN is an IEEE 802.11-based network, different environments may be applicable as well. The wireless network may be a WiMAX-based network (i.e. IEEE 802.16), or an Ultra-WideBand (UWB)-based network (i.e. IEEE 802.15), as a few examples.

Example Wireless Network Configurations/Connections

FIG. 5 is an illustrative representation of a part of the communication system 100 of FIG. 1, which illustrates different types of wireless network configurations which may involve wireless device 201. Wireless networks 104 and 122 are WLANs of the traditional "WLAN infrastructure" type, which typically provide for external network connectivity, as described earlier in relation to FIG. 1. For example, wireless networks 104 and 122 are configured to provide or facilitate access to the Internet 120 (or other communication network, such as a public communication network) for wireless device 201 when connected therewith. In this case, wireless device 201 may make use of its WLAN profiles for connecting with such WLANs.

Other wireless networking configurations include Wi-Fi peer-to-peer (P2P) wireless networking configurations. For example, in FIG. 5 it is shown that wireless device 201 may establish a Wi-Fi P2P wireless connection with a display device 504 (or monitor) which includes a wireless transceiver 502. Such Wi-Fi P2P wireless network connection may be suitable for applications such as, for example, a streaming media application, or a display or presentation application.

It is also shown that wireless device 201 may establish a Wi-Fi P2P wireless network connection with a printer device 508 which includes a wireless transceiver 506. Such a Wi-Fi P2P wireless network connection may be suitable for applications such as, for example, a print application or a facsimile application.

Even further, it is shown that wireless device 201 may establish a Wi-Fi P2P wireless network connection with a tablet 514 which includes a wireless transceiver 512. An example tablet was previously shown and described in relation to FIG. 4. Such Wi-Fi P2P wireless network connection may be suitable for an applications such as, for example, a "bridge" or "bridging" application, where wireless device 201 is further configured for cellular telecommunications (e.g. equipped with a cellular transceiver) but tablet 514 is not. In such application, tablet 514 is able to achieve external network (e.g. Internet) connectivity, being connected to wireless device 201 for communications via the cellular telecommunication network.

It is further shown in FIG. 5 that wireless device 201 may establish a Wi-Fi P2P wireless network connection in an ad hoc wireless network 550 which includes one or more other wireless devices 520, 522, and 524. Such Wi-Fi P2P wireless network connections may be suitable for applications such as, for example, a file sharing application, a conference meeting application, a game or gaming application, or a military application. In many instances, such ad hoc wireless networks provide no external network connectivity.

When wireless device 201 is connected as such, using one or more Wi-Fi P2P wireless network connections, data may be communicated "directly" between wireless device 201 and the other devices (i.e. without the data traversing any fixed wireless network infrastructure).

Profiles for Applications which Make Use of Wi-Fi P2P Wireless Connections

As described earlier, wireless device 201 has different types of applications stored therein. These applications may include, as examples, a messaging application, a voice telephony application, a Web browsing application, a streaming media application, a file sharing application, a game application, a printer application, a facsimile application, a display or presentation application, a military application, as examples. Wireless device 201 is optimized to establish the appropriate wireless networks based on which type of application is invoked.

Figure 6:
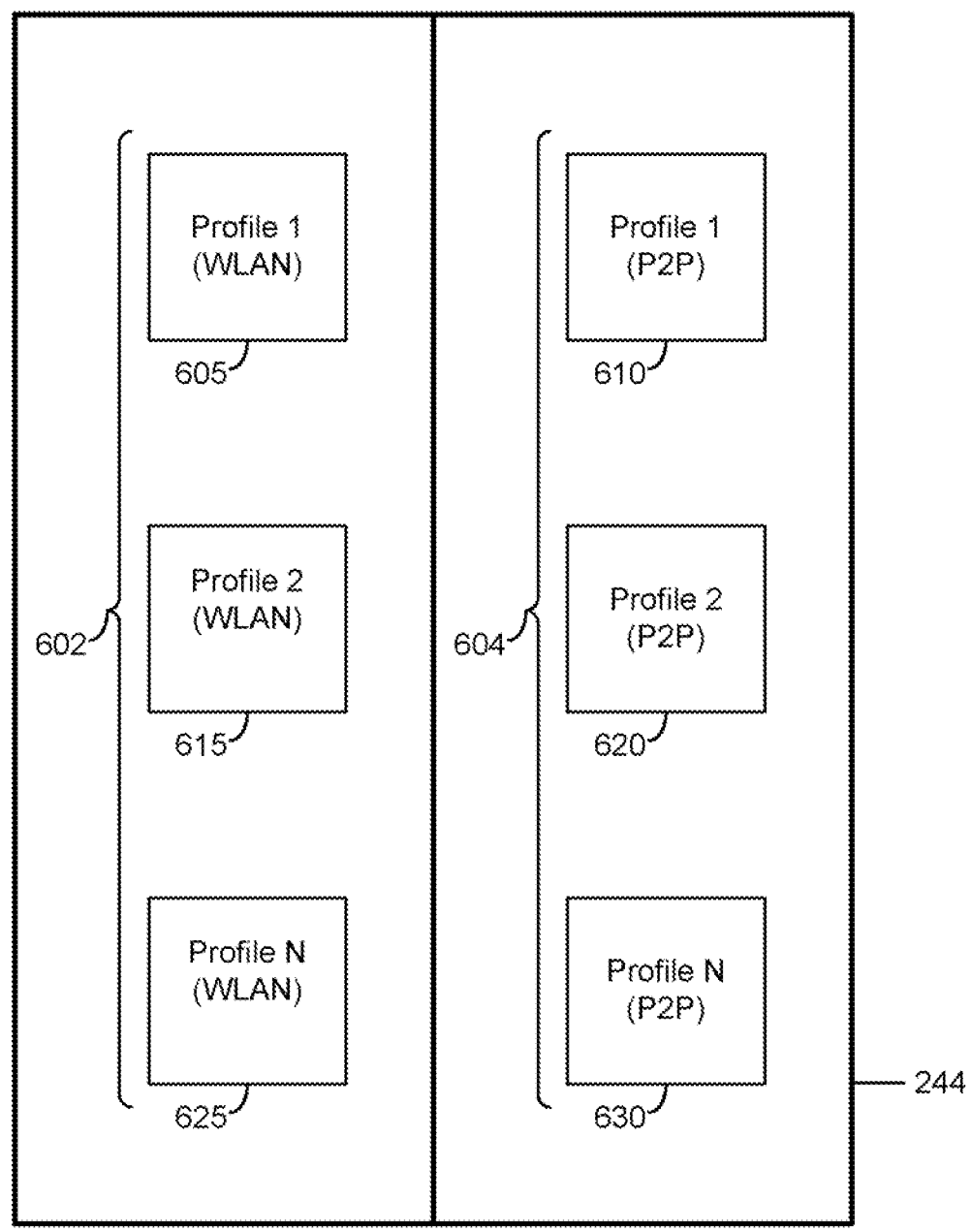
FIG. 6 is an illustrative representation of a portion of memory which includes a plurality of profiles, including profiles associated with applications and/or services which may make use of Wi-Fi P2P wireless network connections.

Referring ahead to FIG. 6, an illustrative representation of another portion of memory 224 of wireless device 201 is shown. Memory 224 is shown to store a plurality of profiles for wireless networking. The profiles include one or more profiles 602 associated with WLAN infrastructure networks, and/or one or more profiles 604 associated with applications and/or services which utilize Wi-Fi P2P wireless network connections. In FIG. 6, profiles 602 are shown to include profiles 605, 615, and 625, whereas profiles 604 are shown to include profiles 610, 620, and 630. Profiles 602 may be or be referred to as WLAN profiles, whereas profiles 604 may be or be referred to as Wi-Fi P2P wireless networking profiles or Wi-Fi Direct profiles.

Each one of profiles 602 is associated with a particular WLAN infrastructure network, and includes a plurality of parameters and/or properties for accessing the particular WLAN. The WLAN information may include an identification which identifies the WLAN to access (e.g. a SSID or ESSID). The WLAN information may also include authentication and/or security information for obtaining access to the WLAN (e.g. a network key, passkey, security key, etc.). One of the WLANs appropriate WLAN from profiles 602 will be selected for communication when available, as prioritized in a prioritized list of the profiles 602. When not connected in a WLAN, the wireless device normally operates to search for WLANs identified in its stored profiles 602. Conversely, the wireless device normally refrains from searching for and communicating in WLANs other than those WLANs identified in stored profiles 602.

On the other hand, each one of profiles 604 is associated with one of the applications and/or services which utilizes a particular type and/or configuration of Wi-Fi P2P wireless network (or Wi-Fi Direct network). Each one of profiles 604 includes parameters and/or properties associated with establishing the particular type and/or configuration of Wi-Fi P2P wireless network for the application and/or service. Profiles 604 may be created, viewed, updated, enabled, and disabled, as described in the present disclosure (see e.g. discussion in relation to FIG. 10).

Properties in profiles 604 may include the following. Properties may include a device type property which indicates a device type of the device for the Wi-Fi P2P wireless network connection to be established. The device type may be the device type that is being searched for in the discovery. Note that there may be two device types specified in the profile: a primary device type and a secondary device type. The device types may be or include the appropriate device types in the Wi-Fi Direct Network as described in the Wi-Fi Peer-To-Peer (P2P) Technical specification (e.g. in Annex B thereof). The device types may be or include the predefined values as set forth therein. The device type may be or include category identification (ID) and/or subcategory identification (ID). Examples of such types are as follows: a computer, an input device, a printer, a camera, a display (monitor), a gaming device, an audio device, a multimedia device, or a telephone device.

Properties may additionally or alternatively include an advertised device type property which indicates the device type of wireless device 201. The advertised device type may be the device type to be advertised by wireless device 201. Note that there may be two advertised device types specified in the profile: a primary advertised device type, and a secondary advertised device type. The advertised device types may be or include the appropriate device types in the Wi-Fi Direct Network as described in the Wi-Fi Peer-To-Peer (P2P) Technical specification (e.g. in Annex B thereof). The device types may be or include the predefined values as set forth therein. The advertised device type may be or include category identification (ID) and/or subcategory identification (ID). Examples of such types are as follows: a computer, an input device, a printer, a camera, a display (monitor), a gaming device, an audio device, a multimedia device, or a telephone device.

Properties in profiles 604 may additionally or alternatively include a service type property which indicates a service type which identifies the service associated with the device. For example, the service types may be or include the appropriate service types as described in the Wi-Fi Peer-To-Peer (P2P) Technical specification (e.g. in Annex E thereof). Examples of such types are as follows: a file sharing service, or a printing service. Alternatively, examples of such types are as follows: Apple File Sharing (AFP) service (or AFP over TCP service), or IP Printing (IPP) Bonjour service.

Properties in profiles 604 may additionally or alternatively include a discovery mode property which indicates a mode utilized for the discovery of devices for the Wi-Fi P2P wireless network connection. The discovery mode property may be set to one of the following: a triggered mode of discovery, or a periodic mode of discovery. Alternatively, the discovery mode may be set to one of the following: a triggered mode of discovery, a periodic mode of discovery, or a Group Owner (GO) mode of discovery.

Properties in profiles 604 may additionally or alternatively include a persistent property or indication which indicates whether or not the Wi-Fi P2P wireless network is persistent. If the network is persistent, when an application is opened or activated, the wireless device connects to a previously-established Wi-Fi P2P wireless network.

Properties in profiles 604 may additionally or alternatively include a coexistence indication or property which indicates whether the Wi-Fi P2P wireless network connection associated with this profile may be maintained while the wireless device operates as a client in an infrastructure network. Properties may additionally or alternatively include another coexistence indication or property which indicates whether the Wi-Fi P2P wireless network connection associated with this profile may be maintained while maintaining another Wi-Fi P2P wireless network connection.

Note that properties in profiles 604 may omit a device identifier which identifies any particular device for connection, and/or may omit a wireless network identifier which identifies any particular wireless network for connection. Rather, properties in at least some of profiles 604 indicate connection with particular types of devices (and/or services), and/or indicate connection with particular types of networks, as opposed to specifically identified devices, or specifically identified networks.

More on Use Cases: Additional/Alternative Profile Details

It is noted that many peer-to-peer "use cases" for Wi-Fi P2P wireless networking lend themselves to different modes of operation. For example, if a wireless device supports a network gateway feature (e.g. a mobile hotspot or MHO feature), then the wireless device may be configured to establish a persistent Wi-Fi P2P wireless network when the service is enabled. As another example, the same wireless device may require a printer service to allow an application to print a document. In this case, the Wi-Fi P2P wireless network may be established on-demand based on an application trigger. In another example, a social networking application may periodically search for other communication devices running the same social networking application, which may result in the wireless device operating in a periodic discovery mode for other devices which advertise the same service.

To accommodate for such various use cases, profiles associated with the various application/services utilizing Wi-Fi P2P wireless networks are created and stored on the wireless device. These profiles are enabled when needed, such as enabled in response to an activation of an application associated therewith. Further, the profiles may be enabled concurrently.

In one embodiment, the profiles may have data structures defined for compatibility with the Wi-Fi Peer-To-Peer (P2P) Technical specification. Each profile may include information specific to Wi-Fi P2P wireless network operation, including device discovery behavior, service discovery options, coexistence with infrastructures connectivity, as well as operational characteristics of the network (e.g. whether it is persistent, or triggered on application launch).

These profiles may be provisioned as defaults in the wireless device, and/or may be configured by applications when installed. Further, the profiles may be configured via the user interface of the wireless device with use of a human-machine interface (HMI) application that provides management of the profiles. This HMI application may be configured to provide the ability to search for and identify any Wi-Fi P2P wireless networks.

The profiles are used to manage the behavior of the WLAN or Wi-Fi driver of the wireless device to accommodate for the various application/services. The driver may be configured to support each particular use case. More particularly, the driver may use the profile information to manage peer-to-peer communications on the wireless device, as well as to arbitrate between Wi-Fi P2P wireless network and other modes of connectivity (e.g. infrastructure STA mode). The driver may be further configured to support other application requirements, such as sleep modes, discovery modes, and/or coexistence with an infrastructure network connection over WLAN, etc.

An example set of properties and/or parameters relating to the behavioral characteristics are summarized in Table 1 below. The properties/parameters in Table 1 may be a subset of parameters contained in such "Wi-Fi Direct" profile to control wireless networking behavior. Such properties/parameters may be included with a set of standard operating parameters for the driver.

TABLE 1

Wi-Fi Direct Profile Properties/Parameters

| Property | Description |
| --- | --- |
| IsPersistent | Indicates whether the Wi-Fi Direct Network is persistent |
| ConnectionInformation | Wi-Fi Direct network information for a persistent profile |
| IsGroupOwner | Indicates whether the device assumes the role of Group Owner (GO) at launch |
| DeviceType | Indicates the device type being searched for to establish the Wi-Fi Direct Network (e.g. as described in Annex B of the Wi-Fi Peer-To-Peer (P2P) Technical specification) |
| AdvertDeviceType | Indicates the device type to be advertised (e.g. as described in Annex B of the Wi-Fi Peer-To-Peer (P2P) Technical specification) |
| ServiceProtocolType | Indicates the service type of service being searched for (e.g. as described in Annex E and F of the Wi-Fi Peer-To-Peer (P2P) Technical specification) |
| DiscoveryMode | Indicates the type of discovery mode: Group Owner (GO) Mode, Triggered Mode, or Periodic Mode |
| DiscoveryParameters | Parameters for discovery, including Wi-Fi Direct defined parameters, and/or Periodic parameters (e.g. period and length of discovery) |
| CoexistWithSTAMode | Indicates whether the network can be established while the device is operating in STA mode |
| CoexistWithOtherWFDService | Indicates whether the device can coexist in an already-established Wi-Fi Direct Network |
| TDLSCapable | Indicates whether the device is TDLS capable |
| EnableMode | Indicates how the profile is instantiated. Triggered at application launch, or operate when a device of a matching service is discovered. |

The property of IsPersistent indicates whether at launch, the wireless device connects to a previously-established Wi-Fi Direct network. The ConnectionInformation parameter stores details on the network.

The ConnectionInformation parameters are a group of parameters which provide connection information for a persistent Wi-Fi direct network.

The property of IsGroupOwner indicates whether the wireless device assumes the role of Group Owner (GO) when the Wi-Fi Direct network is launched. The parameters may be True, False, or Negotiated.

The property of ServiceType indicates the service type of service, e.g. as defined in the Wi-Fi P2P specification. This information is used for Wi-Fi Direct network discovery:

The property of DeviceType allows for different device types to be searched for depending on which Wi-Fi Direct profile is enabled. A permissible set of device types is given in Annex B of the Wi-Fi Peer-To-Peer (P2P) Technical specification. If more than one profile is enabled, the first profile is searched for as the primary device type and subsequent profiles are searched for as secondary device types.

The property of AdvertDeviceType allows for different device types to be advertised depending on which Wi-Fi direct profile is enabled. A permissible set of device types is given in Annex B of the Wi-Fi Peer-To-Peer (P2P) Technical specification. If more than one profile is enabled, the first profile is advertised as the primary device type and subsequent profiles are advertised as secondary device types.

The property of ServiceProtocolType is the service identifier for the service, service definition that is used for Wi-Fi P2P discovery. A permissible set of ServiceProtocolTypes is given in Annex E of the Wi-Fi Peer-To-Peer (P2P) Technical specification.

The property of DiscoveryMode indicates how the wireless device behaves for discovery when a profile is enabled. If the discovery mode type is Group Owner (GO), the wireless device performs discovery only after it launches the Wi-Fi P2P wireless network as a Group Owner (GO). Otherwise, the discovery mode is triggered (i.e. started when signaled by an application) or periodic (i.e. periodically goes into discovery mode). The DiscoveryParameters indicate how long the device spends in discovery mode and the interval between discovery periods.

The property of CoexistwithSTAMode indicates whether the Wi-Fi Direct network will operate while the device operates as a STA on an infrastructure WLAN network. Otherwise the Wi-Fi Direct operations would be restricted to periods where the device is not operating in STA mode. The indication of CoexistWithOtherWFD-Services indicates whether the Wi-Fi Direct network will operate at the same time as another Wi-Fi Direct network. For instance, a device may use an instantiated Wi-Fi Direct network for multimedia and printing at the same time, but not for multimedia and network gateway (mobile hotspot) concurrently.

The property of TDLSCapable indicates whether the wireless device supports TDLS (Tunneled Direct Link Setup) technology. This indication allows the wireless device to advertise the indication during the discovery process. For example, if two devices are connected to the same infrastructure network and an application is activated to trigger an enabling of a Wi-Fi Direct profile, the devices may want to establish a TDLS link rather than a Wi-Fi Direct link to provide (more efficient) communications.

The property of EnableMode indicates how the Wi-Fi Direct network is established. For example, the establishing may be triggered on application launch, or may be enabled to signal an application to launch when it discovers another communication device advertising a device type and/or a service type of interest.

Techniques in Relation to Flowcharts/Message Flow Diagrams

Figure 7:
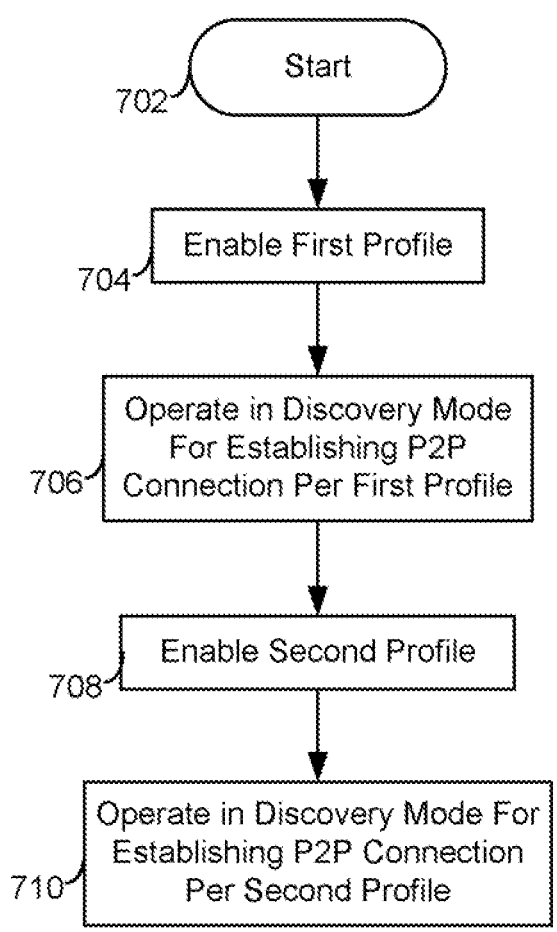
FIG. 7 is a flowchart for describing a method for use in facilitating Wi-Fi P2P wireless networking of the wireless device.

FIG. 7 is a flowchart for describing a method for use in facilitating Wi-Fi P2P wireless networking for the wireless communication device. The method of FIG. 7 may be performed by wireless device 201 described in relation to FIGS. 1-6. In particular, the techniques described in relation to the flowchart may be performed by one or more controllers or processors of the wireless device along with its wireless or RF transceiver. A computer program product which may embody the technique may include a computer readable medium (e.g. memory of the communication device, computer disk, CD-ROM, etc.) having computer instructions stored therein which are executable by the one or more processors of the wireless device for performing the technique. In such technique, the wireless device may operate in accordance with or be compatible with the Wi-Fi P2P wireless network protocols in the Wi-Fi Peer-To-Peer (P2P) Technical specification.

The wireless device is configured to store a plurality of profiles in its memory. The profiles include profiles associated with applications which utilize the Wi-Fi P2P wireless network connections. Each profile may be either "enabled" (or alternatively activated, in an enabled state, or in an active or activated state) or "disabled" (or alternatively deactivated, in a disabled state, or in a deactive or deactivated state). Each profile has properties and/or parameters contained therein. Also, profiles may be concurrently enabled. Put another way, more than one profile may be in an active state at any given time.

Beginning at a start block 700 of FIG. 7, the wireless device enables a first profile (step 704 of FIG. 7). The wireless device may enable the first profile in response to a first application of the wireless communication device being activated (e.g. launched or opened). In response, the wireless device operates its wireless transceiver in a discovery mode, for use in establishing a first Wi-Fi P2P wireless network connection for the first application, in accordance with one or more properties from the first profile (step 706 of FIG. 7). The discovery may be for the discovery of one or more Wi-Fi P2P wireless devices and/or services in accordance with one or more properties in the first profile. The discovery mode may be, for example, a periodic discovery, which is a discovery which occurs periodically while the first Wi-Fi P2P wireless network connection is unavailable. As a result of step 706, the first Wi-Fi P2P wireless network connection may be established, depending on the outcome of the discovery.

The wireless device may subsequently enable a second profile (step 708 of FIG. 7). The first profile and the second profile may be enabled concurrently. The wireless device may enable the second profile in response to a second application of the wireless communication device being activated (e.g. launched or opened). In response, the wireless device operates its wireless transceiver in a discovery mode, for use in establishing a second Wi-Fi P2P wireless network connection for the second application, in accordance with one or more properties in the second profile (step 710 of FIG. 7). The discovery may be for the discovery of one or more Wi-Fi P2P wireless devices and/or services in accordance with one or more properties from the second profile. The discovery mode may be, for example, a periodic discovery, which is a discovery which occurs periodically while the second Wi-Fi P2P wireless network connection is unavailable. As a result of step 710, the second Wi-Fi P2P wireless network connection may be established, depending on the outcome of the discovery.

The flowchart in FIG. 7 is shown to end after step 710, however, the technique may continue with other or additional profiles being enabled concurrently with the others.

Further steps which may be employed in relation to the method of FIG. 7 are now described. In the present discussion, it is noted that each profile includes at least a discovery mode property and a device type property. In response to the first application being activated, the wireless device enables the first profile (again, step 704 of FIG. 7), and therefore a discovery mode is enabled (again, step 706 of FIG. 7) for performing discovery in accordance with the discovery mode property retrieved from the first profile associated the first application.

When one or more devices are available for discovery for the first application, the wireless device receives information from each device. The received information includes a device identifier and a device type. The wireless device then filters the received information, to provide filtered information associated with one or more devices having a device type that matches the device type property retrieved from the first profile. Here, the wireless device may "filter out" or ignore received information associated with devices having devices types that fail to match the device type property from the first profile. The wireless device then communicates or otherwise provides this filtered information to the first application. Note that such filtering may further be performed with respect to the service type property and service type received from the devices. Subsequently, the wireless device may establish, in accordance with one or more properties retrieved from the first profile, a Wi-Fi P2P wireless network connection with at least one of the devices.

In response to the second application being activated, the wireless device enables the second profile (again, step 708 of FIG. 7), and therefore a discovery mode is enabled (again, step 710 of FIG. 7) for performing discovery in accordance with the discovery mode property retrieved from the second profile associated the second application. The discovery modes for the first application and the second application may be enabled concurrently. When one or more devices are available for discovery for the second application, the wireless device receives information from each device. The received information includes a device identifier and a device type. The wireless device filters the received information, to provide filtered information associated with one or more devices having a device type that matches the device type property retrieved from the second profile. The wireless device may "filter out" or ignore received information associated with devices having devices types that fail to match the device type property from the second profile. The wireless device then communicates or otherwise provides this filtered information to the second application. Note that such filtering may further be performed with respect to the service type property and service type received from the devices. The wireless device may then establish, in accordance with one or more properties retrieved from the second profile, a Wi-Fi P2P wireless network connection with at least one of the devices.

Note that the ordering of steps in FIG. 7 may be varied and, in one embodiment, both first and second profiles are enabled at the same or substantially the same time (i.e. steps 704 and 708 occur at the same or substantially the same time). In this case, the discovery for both first and second applications/profiles may be consolidated (i.e. the discovery of different types of devices and/or different types of services for different applications may be performed at the same time). When the first and second profiles are enabled at the same or substantially the same time, such technique may be performed as follows. When one or more devices are available for discovery, the wireless device receives information from each device. The received information includes a device identifier and a device type. In a first filtering process, the wireless device filters the received information to provide filtered information associated with one or more devices having a device type that matches the device type property retrieved from the first profile. Here, the wireless device may "filter out" or ignore received information associated with devices having devices types that fail to match the device type property from the first profile. The wireless device then communicates or otherwise provides this filtered information to the first application. In a second filtering process, the wireless device filters the received information to provide filtered information associated with one or more devices having a device type that matches the device type property retrieved from the second profile. Here, the wireless device may "filter out" or ignore received information associated with devices having devices types that fail to match the device type property from the second profile. The wireless device then communicates or otherwise provides this filtered information to the second application.

Subsequently, the wireless device may establish, in accordance with one or more properties retrieved from the first (or the second) profile, a Wi-Fi P2P wireless network connection with at least one of the devices, for the first (or the second) application. Note that the filtering may further be performed with respect to the service type property and service type received from the devices.

Figure 8:
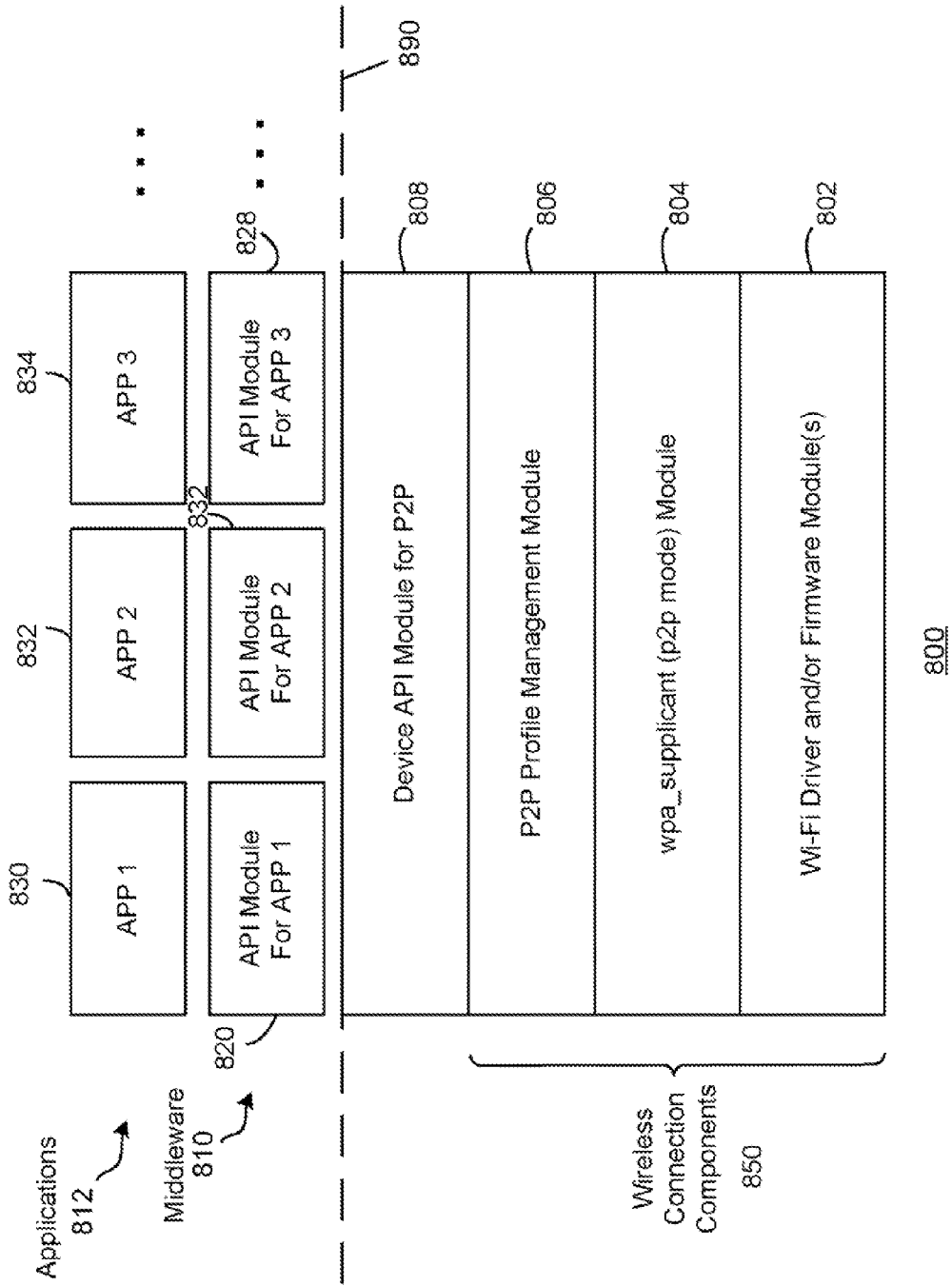
FIG. 8 is an illustrative diagram of modules/components of the wireless device associated with Wi-Fi P2P wireless networking techniques of the present disclosure.

FIG. 8 is an illustrative diagram 800 of modules/components of the wireless device which may be utilized for Wi-Fi P2P wireless networking techniques of the present disclosure. As described earlier above, one or more controllers or processors of wireless device 201 may embody the logic and/or algorithms to perform the described techniques with use of the wireless transceiver of the wireless device. However, wireless device 201 may include the following further modules or components for implementing the techniques, as described in FIG. 8. In FIG. 8, wireless connection components 850 may include a (Wi-Fi) driver and/or firmware module 802, a (Wi-Fi Protected Access "WPA") supplicant module 804, and a profile management module 806. Profile management module 806 is configured to provide control and/or management functions for the profiles utilized for Wi-Fi P2P wireless network connections. Supplicant module 804 is a supplicant configured to support particular operating systems (e.g. Windows, Linux, BSD) for providing wireless networking functions, such as WPA and WPA2 functions. Supplicant module 804 may include particular functions for communication and security, including functions for association, authentication, roaming, and key negotiation, as examples.

As shown in FIG. 8, a device application programming interface (API) module 808 for Wi-Fi P2P networking is provided for communicating data between components 850 and applications 812. In this example, the three (3) applications 812 shown include applications 830, 832, and 834, which may be different applications for different services and/or from different vendors (e.g. see discussion in relation to FIG. 5). Middleware 810 is required between applications 812 and device API module 808, so that data may be properly communicated between applications 812 and components 850. For example, an API module 820 may be utilized between application 830 and device API module 808; an API module 822 may be utilized between application 832 and device API module 808; and an API module 824 may be utilized between application 834 and device API module 808.

A dashed line 890 in FIG. 8 identifies the separation between those modules that may be initially provided in the wireless device (e.g. initially provided at manufacture and/or sale), and those applications 812 (and middleware 810) which may be subsequently installed or provided in the wireless device (e.g. subsequently provided after manufacture or sale).

Figure 9:
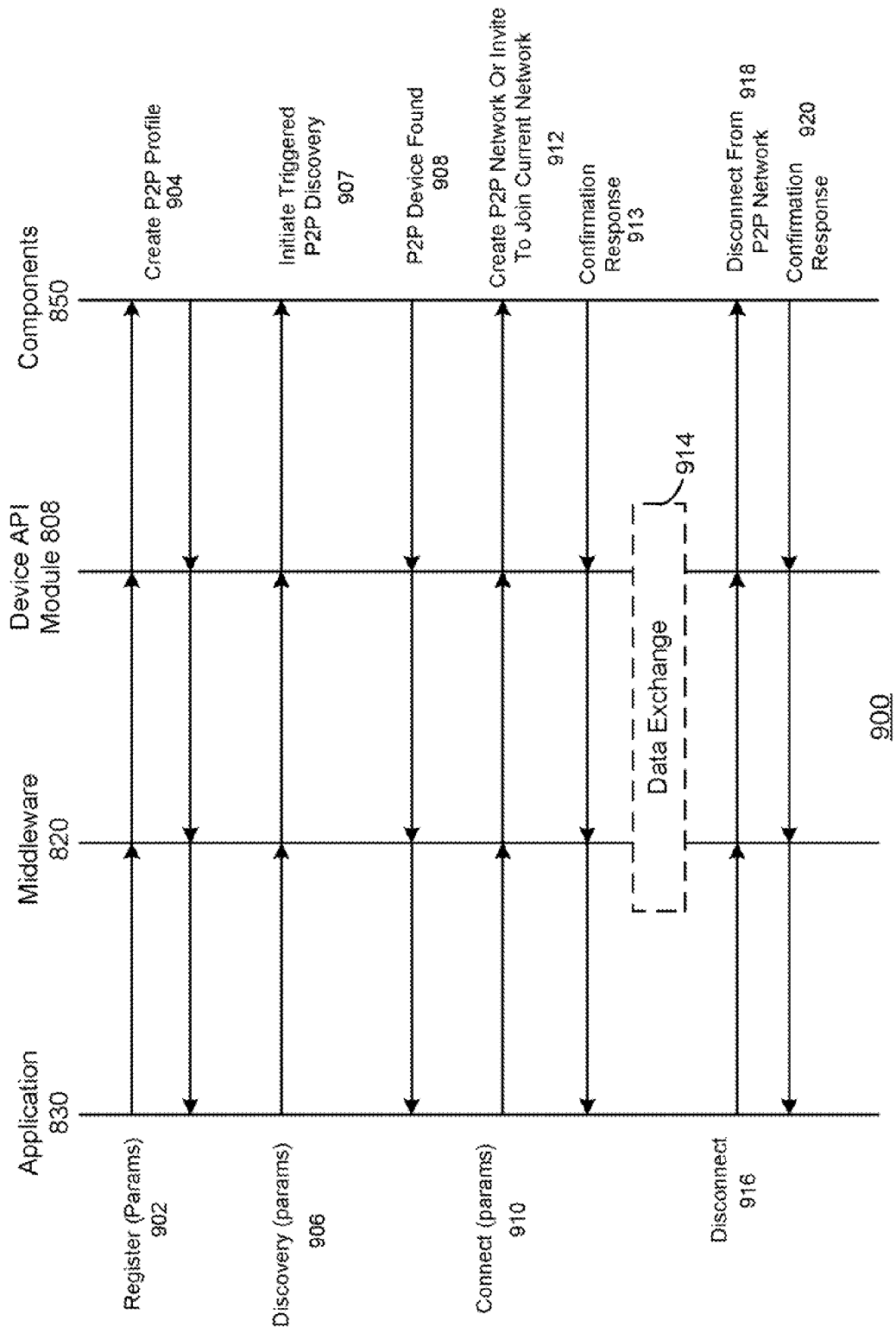
FIG. 9 is a diagram for illustrating an example message flow for general operation for Wi-Fi P2P wireless networking per techniques of the present disclosure.

FIG. 9 is a diagram 900 for illustrating a message flow in one example for facilitating Wi-Fi P2P wireless networking of the present disclosure. This message flow may utilize the appropriate properties and/or parameters of the profiles as described above. Process steps in this example message flow may be utilized as additional steps (or even alternative steps where apparent) in the techniques of FIG. 7 or other techniques described herein.

Initially in FIG. 9, application 830 is stored and/or installed in wireless device 201. Upon storage and/or installation, application 830 is registered in wireless device 201 (process step 902). In the registration, a registration request is communicated from application 830 to wireless connection component(s) 850 via middleware 820 and device API module 808. The registration request may include one or more parameters associated with the appropriate Wi-Fi P2P wireless network connection to be established for application 830. Components 850 receive the registration request and/or its associated parameters and, in response, create a profile associated with the application (process step 904). The profile includes one or more parameters and/or properties associated with establishing the Wi-Fi P2P wireless network connection for application 830.

Subsequently, application 830 may be activated in a request for establishing service (process step 906). For example, application 830 may be activated in response to receiving a user input via user interface of wireless device 201. The request for service triggers wireless device 201 to operate in a discovery mode (process step 907). Here, a discovery request is communicated from application 830 to wireless connection component(s) 850 via middleware 820 and device API module 808. Components 850 receive the discovery request and/or its associated properties and, in response, cause wireless device 201 to operate in the discovery mode for discovering device(s) and/or service for establishing a Wi-Fi P2P wireless network connection for the application in accordance with one or more properties in the profile. The discovery mode may be, for example, a periodic discovery mode where a periodic discovery is performed while the appropriate connection and/or service is unavailable.

In response to discovery, components 850 communicate a discovery response to application 830 via device API module 808 and middleware 820 (process step 908). The discovery response may identify one or more Wi-Fi P2P wireless devices which are discovered during the discovery. Application 830 may, in turn, communicate a connection request to components 850 via middleware 820 and device API module 808 (process step 910). In response to receiving the connection request, components 850 establish a Wi-Fi P2P wireless network connection in a Wi-Fi P2P wireless network with at least some of the discovered Wi-H P2P wireless devices (process step 912). The Wi-Fi P2P wireless network connection may be established based on one or more parameters stored in the profile associated with application 830. Alternatively in process step 912, components 850 may communicate an invitation to a Wi-Fi P2P wireless device for joining an existing Wi-Fi P2P wireless network. In response to establishing the Wi-Fi P2P wireless network connection, components 850 communicate a confirmation response to application 830 via device API module 808 and middleware 820 (process step 913).

Wireless device 201 then communicates data via the Wi-Fi P2P wireless network connection for the service associated with the application 830. The data are communicated or exchanged between application 830 and components 850 (process step 914).

Subsequently, application 830 may be deactivated in a request for terminating the service. For example, application 830 may be deactivated in response to receiving a user input via input interface 206 of wireless device 201. The request for terminating the service triggers a disconnection of the Wi-Fi P2P wireless network connection (process step 916). Here, a disconnection request is communicated from application 830 to wireless connection component(s) 850 via middleware 820 and device API module 808. Components 850 receive the disconnection request and, in response, disconnect from the Wi-Fi P2P wireless network (process step 918). In response to disconnection from the Wi-Fi P2P wireless network, components 850 communicate a confirmation response to application 830 via device API module 808 and middleware 820 (process step 920).

Figure 10:
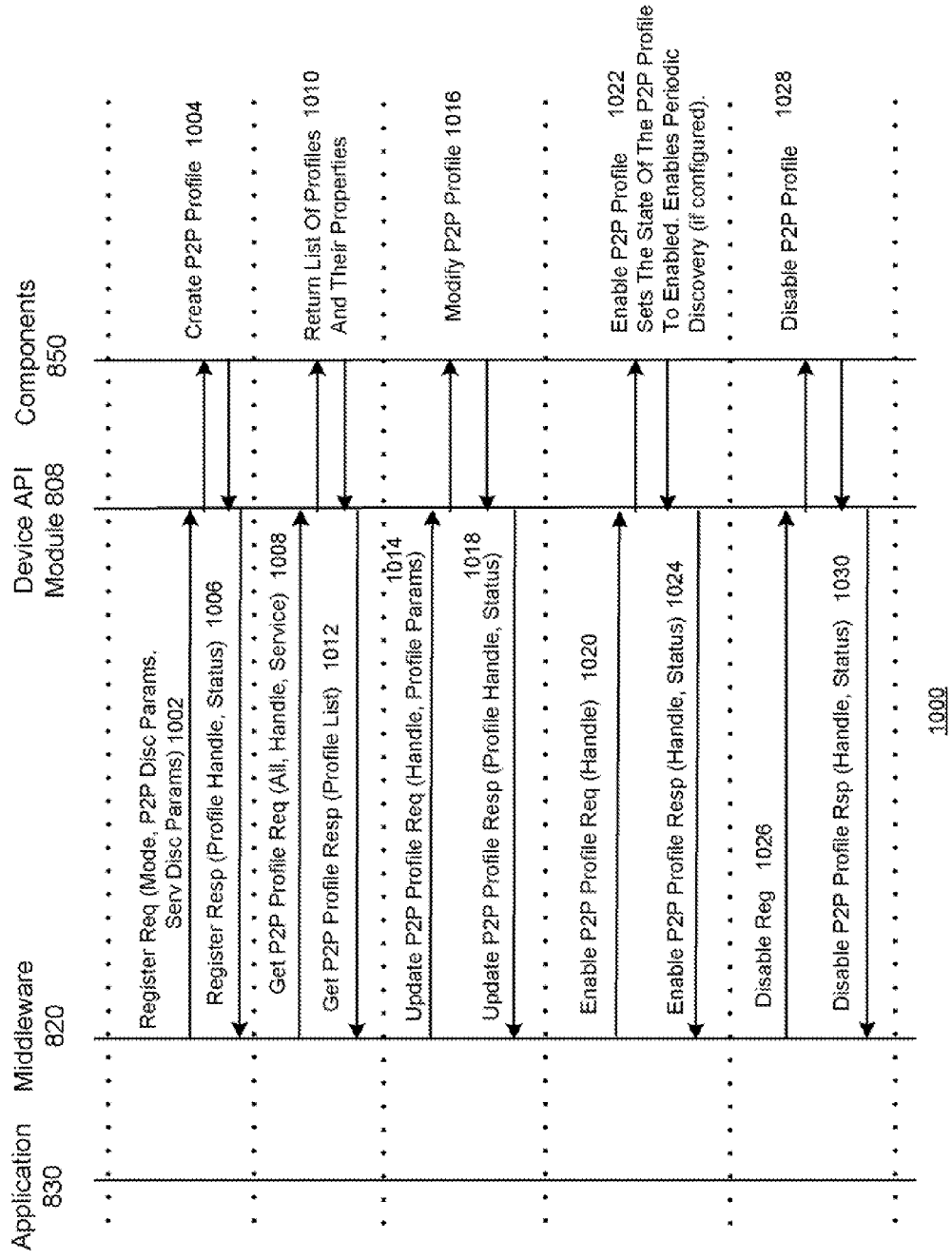
FIG. 10 is a diagram for illustrating example message flows relating to the management of profiles for applications utilizing Wi-Fi P2P wireless network connections.

FIG. 10 is a diagram 1000 for illustrating example message flows relating to the management of profiles for applications utilizing Wi-Fi P2P wireless network connections. Management functions in FIG. 10 include creation, viewing, updating, enabling, and disabling of profiles. This message flow may utilize the appropriate properties and/or parameters of the profiles as described above. Process steps in this example message flow may be utilized as additional steps (or even alternative steps where apparent) in techniques of FIG. 7 or other techniques described herein.

A profile may be created as shown in FIG. 10 as follows. Initially, application 830 is stored and/or installed in wireless device 201. Upon storage and/or installation, application 830 is registered in wireless device 201. In the registration, a registration request is communicated from middleware 820 to wireless connection component(s) 850 via device API module 808 (process step 1002). The registration request may include one or more parameters or properties associated with the appropriate Wi-Fi P2P wireless network connection and/or the service to be established for application 830. See e.g. the description earlier above in relation to the properties and/or parameters of the profiles. Components 850 receive the registration request and/or its associated parameters and, in response, create a profile associated with the application (process step 1004). The profile includes one or more parameters and/or properties associated with establishing the Wi-Fi P2P wireless network connection and/or service for application 830. Components 850 communicate a registration response to middleware 820 via device API module 808 (process step 1006). The registration response may include a profile identifier which identifies the profile or handle ("ProfileHandle"), a profile status ("Status"), and/or other properties.

A profile may be viewed or read as shown in FIG. 10 as follows. For the viewing or reading process, a get profile request is communicated from middleware 820 to wireless connection component(s) 850 via device API module 808 (process step 1008). The get profile request may include a profile identifier which identifies the profile(s) to be read, such as all profiles ("All"), a particular profile ("ProfileHandle"), and one or more profiles associated with a particular service ("Service"). Components 850 receive the get profile request and the profile identifier and, in response, create and return a list of profiles and their associated properties (process step 1010). The list of profiles and their associated properties are communicated from components 850 to middleware 820 via device API module 808 in a get profile response which is received by middleware 820 (process step 1012). The profile(s) may then be viewed in the user interface (e.g. display 204) of wireless device 201.

A profile may be updated as shown in FIG. 10 as follows. In the profile updating process, an update profile request is communicated from middleware 820 to wireless connection component(s) 850 via device API module 808 (process step 1014). The update profile request may include a profile identifier which identifies the profile to update ("ProfileHandle") and the one or more updated parameters or properties ("ProfileParams"). Components 850 receive the update profile request and/or its associated parameters and, in response, update or modify the identified profile (process step 1016). Components 850 communicate an update profile response to middleware 820 via device API module 808 (process step 1018). The update profile response may include the profile identifier which identifies the profile that was updated ("ProfileHandle") and the profile status ("Status").

A profile may be enabled as shown in FIG. 10 as follows. Application 830 may be activated in a request for establishing service. For example, application 830 may be activated in response to receiving a user input via input interface 204 of wireless device 201. The activation of the application and/or the request for service triggers an enabling of the profile associated with the application. Here, an enable profile request is communicated from middleware 1020 to wireless connection component(s) 850 via device API module 808 (process step 1020. The enable profile request may include a profile identifier which identifies profile to enable ("ProfileHandle"). Components 850 receive the enable profile request and, in response, enable the corresponding profile (process step 1022). The enabling of the profile causes wireless device 201 to begin operating in a discovery mode for discovering device(s) and/or service for establishing a Wi-Fi P2P wireless network connection for the application in accordance with one or more properties in the profile. The discovery mode may be a periodic discovery mode where a periodic discovery is performed while the appropriate connection and/or service is unavailable. Components 850 communicate an enable profile response to middleware 820 via device API module 808 (process step 1030). The enable profile response may include the profile identifier which identifies the profile that was enabled ("ProfileHandle") and the profile status ("Status").

A profile may be disabled as shown in FIG. 10 as follows. Application 830 may be deactivated in a request for terminating the service. For example, application 830 may be deactivated in response to receiving a user input via input interface 204 of wireless device 201. The deactivation of application 830 and/or the request for terminating the service triggers a disabling of the profile associated with application 830. Here, a disable profile request is communicated from middleware 820 to wireless connection component(s) 850 via device API module 808. Components 850 receive the disable profile request and, in response, disable the corresponding profile (process step 1028). The disabling of the profile causes wireless device 201 to cease operation of the discovery mode for discovering device(s) and/or service for establishing the Wi-Fi P2P wireless network connection for the application. Components 850 communicate a disable profile response to middleware 820 via device API module 808 (process step 1030). The disable profile response may include the profile identifier which identifies the profile that was disabled ("ProfileHandle") and the profile status ("Status").

Figure 11:
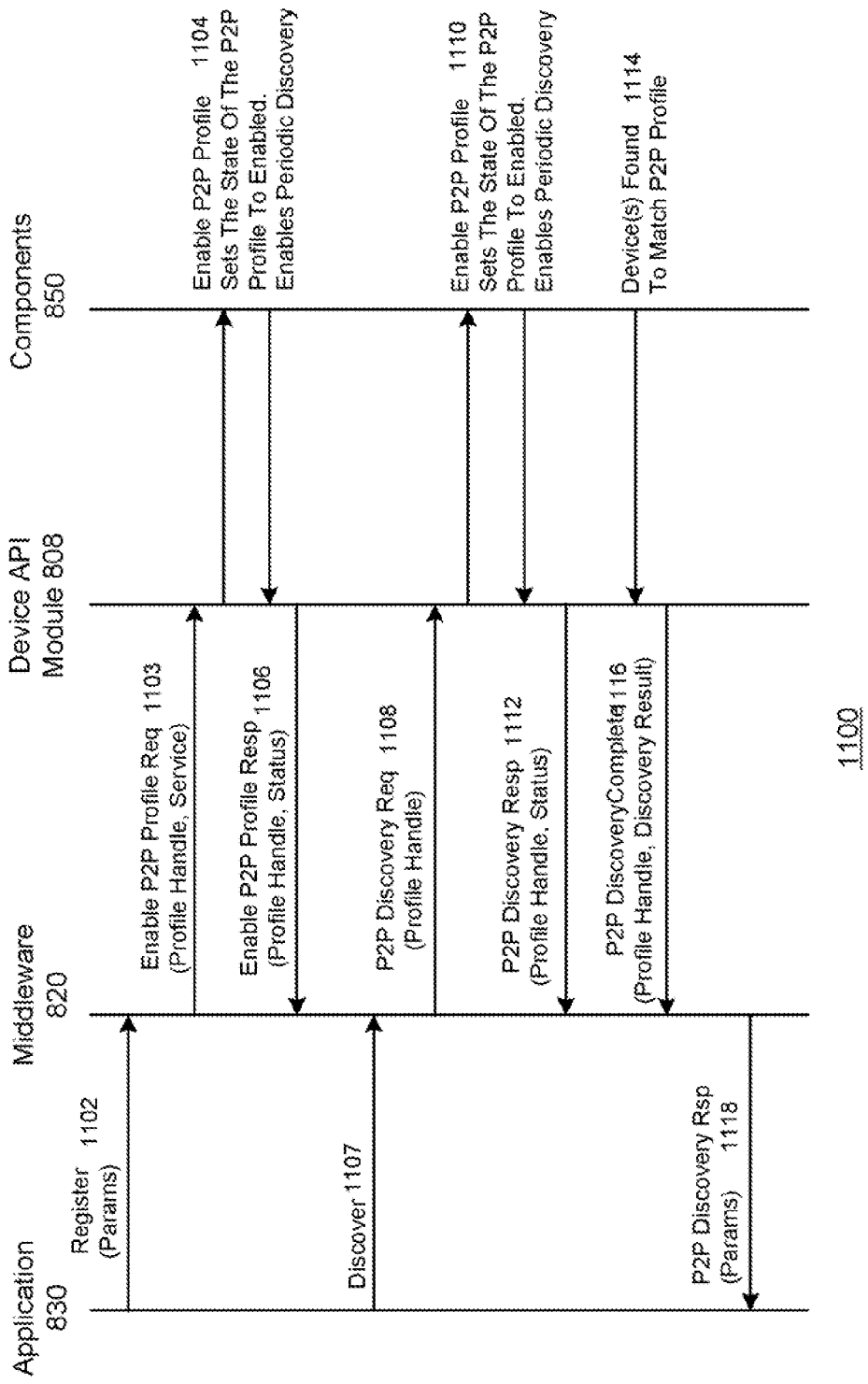
FIG. 11 is a diagram for illustrating another example message flow relating to techniques for use in establishing Wi-Fi P2P wireless network connections.

FIG. 11 is a diagram 1100 for illustrating another example message flow relating to techniques for use in establishing Wi-Fi P2P wireless network connections. This message flow may utilize the appropriate properties and/or parameters of the profiles as described above. Process steps in this example message flow may be utilized as additional steps (or even alternative steps where apparent) in the techniques of FIG. 7 or other techniques described herein.

Application 830 may be activated in a request for establishing service. For example, application 830 may be activated in response to receiving a user input via input interface 204 of wireless device 201. The activation of the application and/or the request triggers an enabling of the profile associated with the application 830. Thus, a request for service (or registration) is communicated from application 830 to middleware 820 (process step 1102). The request may include one or more parameters associated with application 830. Middleware 820 receives the request and/or its associated parameters and, in response, communicates an enable profile request to wireless connection component(s) 850 via device API module 808 (process step 1103). The enable profile request may include a profile identifier which identifies which profile to enable ("ProfileHandle") and/or a service identifier which identifies the service ("Service"). Components 850 receive the enable profile request and, in response, enable the corresponding profile (process step 1104). The enabling of the profile causes wireless device 201 to operate in a discovery mode for discovering device(s) and/or service(s) for establishing a Wi-Fi P2P wireless network connection for the application in accordance with one or more properties in the profile. The discovery mode may be, for example, a periodic discovery mode where a periodic discovery is performed while the appropriate connection and/or service is unavailable. Components 850 communicate an enable profile response to middleware 820 via device API module 808 (process step 1106). The enable profile response may include the profile identifier which identifies the profile that was enabled ("ProfileHandle") and the profile status ("Status").

On the other hand, further in FIG. 11, application 830 may be activated in a request for establishing service which triggers application 830 to send a discovery request to middleware 820 (process step 1107). A corresponding discovery request is communicated from middleware 820 to wireless connection component(s) 850 via device API module 808 (process step 1108). The discovery request may include a profile identifier which identifies which profile to enable ("ProfileHandle") and/or a service identifier which identifies the service ("Service"). Components 850 receive the discovery request and, in response, enable the corresponding profile (process step 1110). The enabling of the profile causes wireless device 201 to operate in a discovery mode for discovering devices and/or services for establishing a Wi-Fi P2P wireless network connection for the application in accordance with one or more properties in the profile. The discovery mode may be a periodic discovery mode where a periodic discovery is performed while the appropriate connection and/or service is unavailable. Components 850 communicate a discovery response to middleware 820 via device API module 808 (process step 1112). The discovery response may include the profile identifier which identifies the profile that was enabled ("ProfileHandle") and the profile status ("Status").

Subsequently, device(s) and/or service may be discovered (process step 1114). When device(s) are discovered, components 850 communicate a discovery complete response to middleware 820 via device API module 808 (process step 1116). The discovery complete response may include a profile identifier which identifies the profile ("ProfileHandle") and/or one or more device identifiers which identify one or more Wi-Fi P2P wireless devices which are discovered during the discovery ("DiscoveryResult"). A corresponding discovery complete response is communicated to application 830 from middleware 820 (process step 1118). Subsequently, application 830 may in turn communicate a connection request to components 850 via middleware 820 and device API module 808 for establishing the Wi-Fi P2P wireless network connection.

Figure 12:
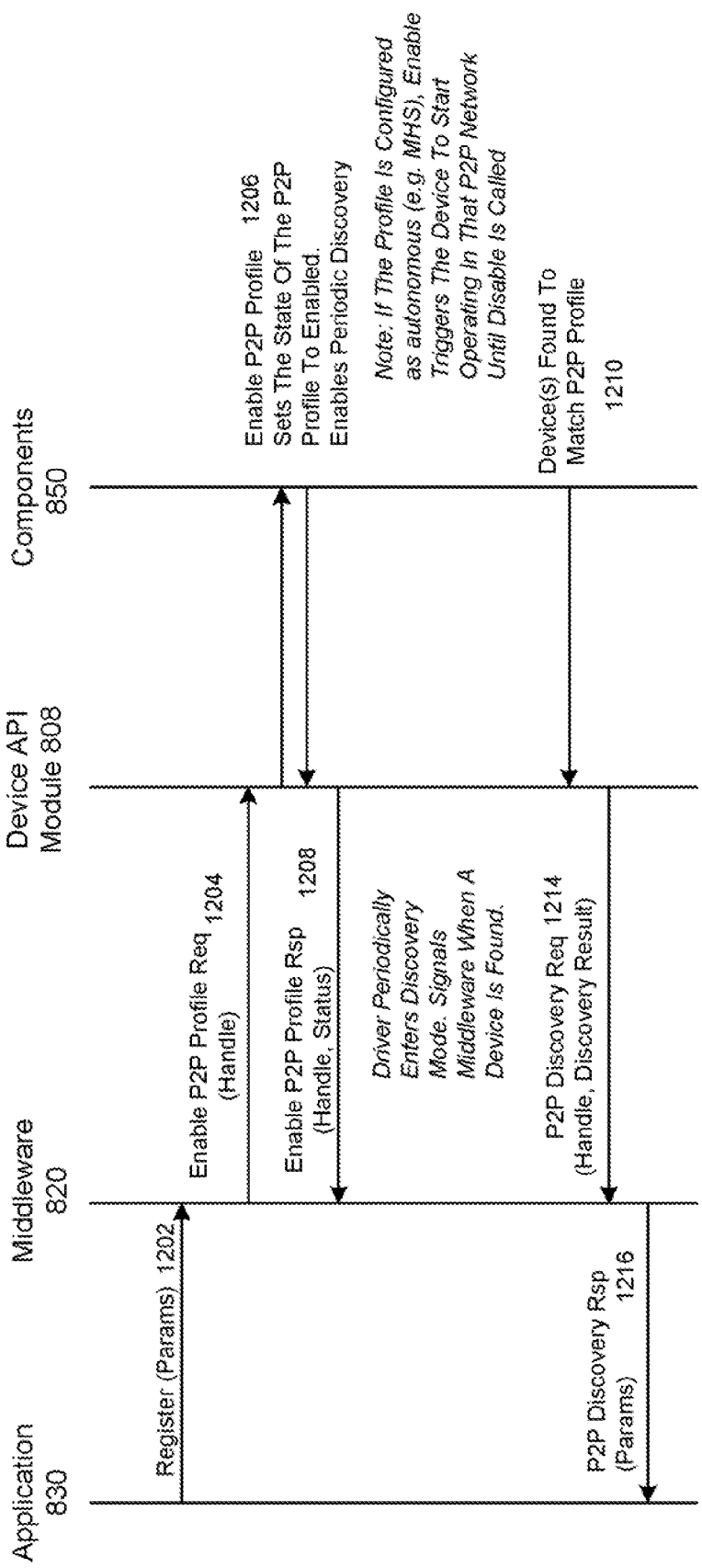
FIG. 12 is a diagram for illustrating another example message flow relating to techniques for use in establishing Wi-Fi P2P wireless network connections, which may relate to use of an autonomous mode of operation for Wi-Fi P2P wireless networking.

FIG. 12 is a diagram 1200 for illustrating another example message flow relating to techniques for use in establishing Wi-Fi P2P wireless network connections. This message flow may relate to use of an autonomous mode of operation for Wi-Fi P2P wireless networking, and/or for Group Owner (GO) operation. The wireless device may be configured to operate as a mobile hotspot (MHO) (i.e. in an AP mode of operation for other devices), in addition to having its wireless telephony capabilities. The message flow may utilize the appropriate properties and/or parameters of the profiles as described above. Process steps in this example message flow may be utilized as additional steps (or even alternative steps where apparent) in techniques of FIG. 7 or other techniques described herein.

Application 830 may be activated in a request for establishing service. For example, application 830 may be activated in response to receiving a user input via user interface of wireless device 201. The activation of the application and/or the request triggers an enabling of the profile associated with the application 830. Thus, a request for service or registration is communicated from application 830 to middleware 820 (process step 1202). The request may include one or more parameters associated with application 830. Middleware 820 receives the request and/or its associated parameters and, in response, communicates an enable profile request to wireless connection component(s) 850 via device API module 808 (process step 1204). The enable profile request may include a profile identifier which identifies which profile to enable ("ProfileHandle") and/or a service identifier which identifies the service ("Service"). Components 850 receive the enable profile request and, in response, enable the corresponding profile (process step 1206). The enabling of the profile causes wireless device 201 to operate in a discovery mode for discovering device(s) and/or service for establishing a Wi-Fi P2P wireless network connection for the application in accordance with one or more properties in the profile. The discovery mode may be a periodic discovery mode where a periodic discovery is performed while the appropriate connection and/ or service is unavailable. Components 850 communicate an enable profile response to middleware 820 via device API module 808 (process step 1208). The enable profile response may include the profile identifier which identifies the profile that was enabled ("ProfileHandle") and the profile status ("Status").

Subsequently, device(s) and/or service(s) may be discovered (process step 1210). When device(s) and/or service(s) are discovered, components 850 communicate a discovery complete response to middleware 820 via device API module 808 (process step 1214). The discovery complete response may include a profile identifier which identifies the profile ("ProfileHandle") and/or one or more device identifiers which identify one or more Wi-Fi P2P wireless devices which are discovered during the discovery ("DiscoveryResult"). A corresponding discovery complete response is communicated to application 830 from middleware 820 (process step 1216). Subsequently, application 830 may in turn communicate a connection request to components 850 via middleware 820 and device API module 808 for establishing the Wi-Fi P2P wireless network connection.

Figure 13:
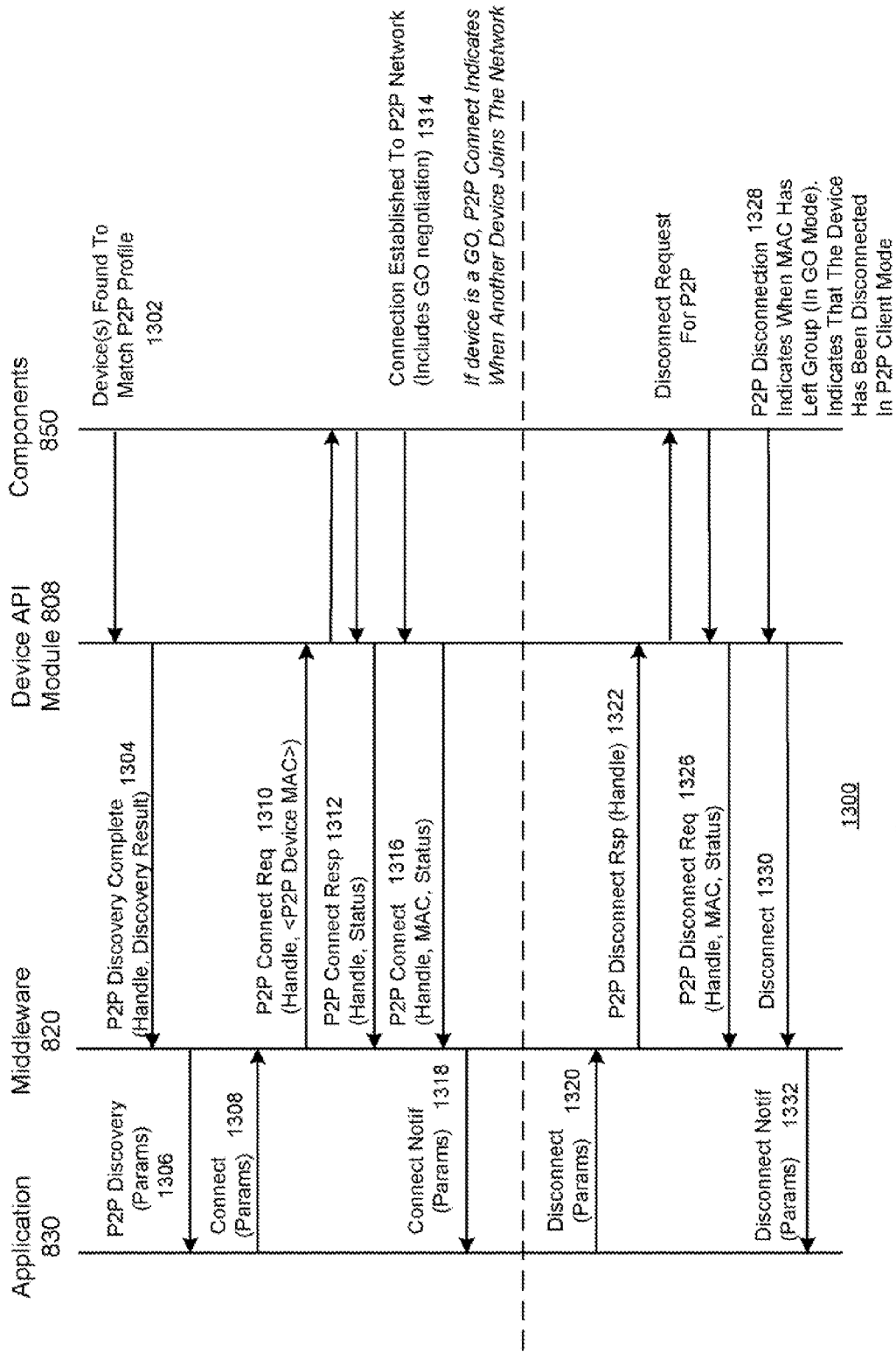
FIG. 13 is a diagram for illustrating another example message flow which relates to particular details for connecting to and disconnecting from Wi-Fi P2P wireless networks.

FIG. 13 is a diagram 1300 for illustrating another example message flow which relates to particular details for connecting to and disconnecting from Wi-Fi P2P wireless networks. This message flow may utilize the appropriate properties and/or parameters of the profiles as described above. Process steps in this example message flow may be utilized as additional steps (or even alternative steps where apparent) in techniques of FIG. 7 or other techniques described herein.

Initially, wireless device 201 is operating in a discovery mode for discovering device(s) and/or service for establishing a Wi-Fi P2P wireless network connection for application 830 in accordance with one or more properties in the profile. The discovery mode may be a periodic discovery mode where a periodic discovery is performed while the appropriate connection and/or service is unavailable. Device(s) and/or service(s) may therefore be discovered (process step 1302). When device(s) and/or service(s) are discovered, components 850 communicate a discovery complete response to middleware 820 via device API module 808 (process step 1304). The discovery complete response may include a profile identifier which identifies the profile ("ProfileHandle") and/or one or more device identifiers which identify one or more Wi-Fi P2P wireless device(s) and/or service(s) which are discovered during the discovery ("DiscoveryResult"). Correspondingly, a discovery complete response is communicated to application 830 from middleware 820 (process step 1306).

In response, application 830 may communicate a connection request to middleware 820 (process step 1308). Correspondingly, a connection request is communicated from middleware 820 to components 850 via device API module 808 (process step 1310). The connection request may include one or more properties or parameters for the connection to be established. The properties or parameters may include the profile identifier which identifies the profile ("ProfileHandle"), and one or more device identifiers which identify the one or more devices for connection ("P2PDeviceMAC"). The device identifier may be or include the MAC address of the device for connection. In response, components 850 communicate a connection response (acknowledgement) to middleware 820 via device API module 808 (process step 1314). The response may include one or more properties or parameters, such as the profile identifier which identifies the profile ("ProfileHandle") and the profile status ("Status"). In response to receiving the connection request, components 850 establish a Wi-Fi P2P wireless network connection in a Wi-Fi P2P wireless network with at least some of the Wi-Fi P2P wireless devices (process step 1314). The Wi-Fi P2P wireless network connection may be established based on one or more parameters stored in the profile associated with application 830. In response to establishing the Wi-Fi P2P wireless network connection, components 850 communicate a connection response to middleware 320 via device API module 808 (process step 1316). Correspondingly, in response, a connection response is communicated from middleware 820 to application 830 (process step 1318). Wireless device 201 then communicates data via the Wi-Fi P2P wireless network connection for the service associated with the application 830. The data are communicated or exchanged between application 830 and components 850.

Subsequently, application 830 may be deactivated in a request for terminating the service. For example, application 830 may be deactivated in response to receiving a user input via input interface 204 of wireless device 201. The request for terminating the service triggers a disconnection of the Wi-Fi P2P wireless network connection. Here, a disconnection request is communicated from application 830 to middleware 820 (process step 1320). Correspondingly, in response, a disconnection request is communicated from middleware 820 to components 850 via device API module 808 (process step 1322). The disconnection request may include one or more properties or parameters for the connection to be established, such as the profile identifier which identifies the profile ("ProfileHandle"). Components 850 receive the disconnection request and, in response, communicate a disconnect response to middleware 820 via device API module 808 (process step 1326). The disconnect response may include one or more properties or parameters associated with the disconnection, such as the profile identifier which identifies the profile ("ProfileHandle"), the device identifier(s) which identifies the device(s) to be disconnected from ("MAC"), and the profile status ("Status"). Components 850 then disconnect from the P2P wireless network (process step 1328). In response to disconnection from the P2P wireless network, components 850 communicate a disconnect notification to middleware 820 via device API module 808 (process step 1330). The disconnect notification may include one or more properties or parameters associated with the disconnection, such as the profile identifier which identifies the profile ("ProfileHandle"), the device identifier(s) which identifies the device(s) that were disconnected from ("MAC"), and the profile status ("Status"). Correspondingly, in response, a disconnection notification is communicated from middleware 820 to application 830 (process step 1332).

Thus, techniques for use in facilitating Wi-Fi peer-to-peer (P2P) wireless communications have been described herein. A wireless communication device is configured to store a plurality of profiles associated with applications. Each profile includes at least a discovery mode property and a device type property. In response to an application being activated, the wireless device enables a discovery mode for performing discovery in accordance with the discovery mode property retrieved from a selected profile associated with the application. When one or more devices are available for discovery, the wireless device receives information from each device, filters the received information to provide filtered information associated with one or more devices having a device type that matches the device type property, and provides the filtered information to the application. The wireless device then establishes, in accordance with one or more properties retrieved from the selected profile, a Wi-Fi P2P wireless network connection with at least one of the devices. The Wi-Fi P2P wireless network connection may be established in accordance with the Wi-Fi Peer-To-Peer (P2P) Technical specification. Different profiles may be enabled concurrently, where discovery in relation to both profiles is performed at the same time.

In another embodiment, a wireless communication device is configured to store a plurality of profiles associated with applications. The wireless device enables a first profile in response to a first application being activated. When the first profile is enabled, the wireless device operates in a discovery mode for use in establishing a first Wi-Fi P2P wireless network connection for the first application in accordance with one or more properties in the first profile. The wireless device also enables a second profile in response to a second application being activated. When the second profile is enabled, the wireless device operates in a discovery mode for use in establishing a second Wi-Fi P2P wireless network connection for the second application in accordance with one or more properties in the second profile. The first profile and the second profile may be enabled concurrently.

In still another embodiment, a wireless communication device is configured to store a plurality of profiles associated with applications. The wireless device enables a first profile in response to a first application of the wireless communication device being activated. The wireless device also enables a second profile in response to a second application of the wireless communication device being activated. The wireless device further enables a discovery mode for performing discovery for the first and the second applications. When one or more devices are available for the discovery, the wireless device receives information from each device. Each discovered device provides information which includes a device identifier and a device type. The wireless device filters the received information to provide first filtered information associated with one or more devices having a device type that matches a first device type property from the first profile, and provides the first filtered information to the first application. The wireless device also filters the received information to provide second filtered information associated with one or more devices having a device type that matches a second device type property from the second profile, and provides the second filtered information to the second application. The wireless device then establishes a Wi-Fi P2P wireless network connection with at least one of the devices. In the above technique, the discovery may be performed for both the first and the second application at the same or substantially the same time.

In yet another embodiment, a wireless device is configured to store a plurality of profiles associated with applications. Each profile includes one or more properties and/or parameters. In response to an application being activated, the device operates in a discovery mode in accordance with the one or more properties/parameters from a selected one of the profiles associated with the application. Alternatively, or additional, the device operates to establishes a Wi-Fi P2P wireless network connection depending on or based on the one or more properties/parameters from the selected profile associated with the application. The one or more properties/parameters may be or include those described earlier above.

The above-described embodiments of the present disclosure are intended to be examples only. Those of skill in the art may affect alterations, modifications and variations to the particular embodiments without departing from the scope of the application. Although the description relates to specific examples for illustration, where the WLAN is an IEEE 802.11-based network, for example, different environments may be applicable as well. As a few other examples, the wireless networking may be based on a WiMAX network (i.e. IEEE 802.16), or an Ultra-WideBand (UWB) network (i.e. IEEE 802.15). The invention described herein in the recited claims intends to cover and embrace all suitable changes in technology.

What is claimed is:

1. A method in a wireless communication device for Wi-Fi peer-to-peer (P2P) wireless communications, the method comprising: storing a plurality of profiles associated with a plurality of applications, each profile including at least a discovery mode property and a device type property; enabling a discovery mode for performing discovery in accordance with the discovery mode property retrieved from a selected one of the profiles associated with an application; when one or more devices are available for discovery: receiving information from each device, each information including a device identifier and a device type; filtering the received information based on device type property, retrieved from the selected profile, to identify each device having a device type that matches the device type property retrieved from the selected profile; providing the filtered information to the application with which the selected profile is associated; and establishing, in accordance with one or more properties retrieved from the selected profile, a Wi-Fi P2P wireless network connection with at least one of the devices, wherein the application comprises a first application, the profile comprises a first profile, the discovery mode property comprises a first discovery mode property, and the device type property comprises a first device type property, the method further comprising: in response to a second application being activated, enabling a discovery mode for performing discovery in accordance with a second discovery mode property retrieved from a second profile associated with the second application; when one or more devices are available for discovery associated with the second application: receiving information from each device, each information including a device identifier and a device type; filtering the received information to provide filtered information associated with one or more devices having a device type that matches a second device type property retrieved from the second profile; and providing the filtered information to the second application.

2. The method of claim 1, wherein the discovery modes for the first application and the second application are enabled concurrently.

3. The method of claim 1, further comprising: wherein the selected profile further includes a service type property; wherein each information received from a device further includes a service type; and filtering the received information to provide filtered information associated with one or more devices having the device type that matches the device type property and a service type that matches the service type property retrieved from the second profile.

4. The method of claim 1, further comprising: in response to the first application being activated, enabling the first profile associated with the first application, for thereby enabling the discovery mode for the first application; in response to the second application being activated, enabling the second profile associated with the second application, for thereby enabling the discovery mode for the second application; and wherein the first profile and the second profile are enabled concurrently.

5. The method of claim 1, wherein the discovery mode property comprises a discovery mode type property which indicates one of a triggered discovery mode or a periodic discovery mode.

6. The method of claim 1, wherein the discovery mode property indicates one of a triggered discovery mode, a periodic discovery, or a group owner (GO) mode, and the profile further includes discovery mode parameters associated with the discovery mode.

7. The method of claim 1, wherein the discovery mode comprises a periodic discovery mode and the discovery mode property indicates a period of the discovery.

8. The method of claim 1, wherein the device type property includes or indicates at least one of the following: a computer, an input device, a printer, a camera, a display, a gaming device, an audio device, a multimedia device, or a telephone device.

9. The method of claim 1, wherein the wireless communication device is configured to communicate in accordance with IEEE 802.11 standards, or the selected profile omits a device identifier.

10. The method of claim 1, wherein the Wi-Fi P2P wireless network connection is established in accordance with the Wi-Fi Peer-To-Peer (P2P) Technical specification.

11. The method of claim 1, wherein the wireless communication device is further configured to store a plurality of WLAN profiles associated with a plurality of WLANs.

12. A computer program product, comprising: a non-transitory computer readable medium; computer instructions stored in the non-transitory computer readable medium; the computer instructions being executable by one or more processors of a wireless communication device for providing communications, by: storing a plurality of profiles associated with applications, each profile including at least a discovery mode property and a device type property; in response to an application being activated, enabling a discovery mode for performing discovery in accordance with the discovery mode property retrieved from a selected one of the profiles associated the application; when one or more devices are available for discovery: receiving information from each device, each information including a device identifier and a device type; filtering the received information based on device type property, retrieved from the selected profile, to identify each device having a device type that matches the device type property retrieved from the selected profile; providing the filtered information to the application with which the selected profile is associated; and establishing, in accordance with one or more properties retrieved from the selected profile, a Wi-Fi P2P wireless network connection with at least one of the devices, wherein the application comprises a first application, the profile comprises a first profile, the discovery mode property comprises a first discovery mode property, and the device type property comprises a first device type property, the method further comprising: in response to a second application being activated, enabling a discovery mode for performing discovery in accordance with a second discovery mode property retrieved from a second profile associated with the second application; when one or more devices are available for discovery associated with the second application: receiving information from each device, each information including a device identifier and a device type; filtering the received information to provide filtered information associated with one or more devices having a device type that matches a second device type property retrieved from the second profile; and providing the filtered information to the second application.

13. A wireless communication device, comprising: one or more processors; a wireless transceiver coupled to the one or more processors, the wireless transceiver being configured to provide communications over peer-to-peer (P2P) wireless network connections; memory coupled to the one or more processors; the memory being configured to store a plurality of profiles associated with a plurality of applications, each profile including at least a discovery mode property and a device type property; the one or more processors being configured to: in response to an application being activated, enable a discovery mode for performing discovery in accordance with the discovery mode property retrieved from a selected one of the profiles associated the application; when one or more devices are available for discovery: receive information from each device, each information including a device identifier and a device type; filter the received information based on device type property, retrieved from the selected profile, to provide filtered information associated with one or more devices having a device type that matches the device type property retrieved from the selected profile; provide the filtered information to the application with which the selected profile is associated; and establish, in accordance with one or more properties retrieved from the selected profile, a Wi-Fi P2P wireless network connection with at least one of the devices, wherein the application comprises a first application, the profile comprises a first profile, the discovery mode property comprises a first discovery mode property, and the device type property comprises a first device type property, the one or more processors being further configured to: in response to a second application being activated, enable a discovery mode for performing discovery in accordance with a second discovery mode property retrieved from a second profile associated with the second application; when one or more devices are available for discovery associated with the second application: receive information from each device, each information including a device identifier and a device type; filter the received information to provide filtered information associated with one or more devices having a device type that matches a second device type property retrieved from the second profile; and provide the filtered information to the second application.

14. The wireless communication device of claim 13, wherein the one or more processors are further configured to enable the discovery modes for the first application and the second application concurrently.

15. The wireless communication device of claim 13, wherein each profile further includes a service type property, and each information received from a device further includes a service type, the one or more processors being further configured to: filter the received information to provide filtered information associated with one or more devices having the device type that matches the device type property and a service type that matches the service type property retrieved from the second profile.

16. The wireless communication device of claim 13, wherein the one or more processors are further configured to: in response to the first application being activated, enable the first profile associated with the first application, for thereby enabling the discovery mode for the first application; in response to the second application being activated, enable the second profile associated with the second application, for thereby enabling the discovery mode for the second application; and wherein the first profile and the second profile are enabled concurrently.

17. The wireless communication device of claim 13, wherein the discovery mode property comprises a discovery mode type property which indicates one of a triggered discovery mode or a periodic discovery mode.

18. The wireless communication device of claim 13, wherein the discovery mode comprises a periodic discovery mode and the discovery mode property indicates a period of the discovery.

19. The wireless communication device of claim 13, wherein the wireless communication device is configured to communicate in accordance with IEEE 802.11 standards.

20. The wireless communication device of claim 13, wherein the Wi-Fi P2P wireless network connection is established in accordance with the Wi-Fi Peer-To-Peer (P2P) Technical specification.

21. A wireless communication device, comprising: one or more processors; a wireless transceiver coupled to the one or more processors, the wireless transceiver being configured to provide communications over Wi-Fi peer-to-peer (P2P) wireless network connections; memory coupled to the one or more processors; the memory being configured to store a plurality of profiles associated with applications; the one or more processors being configured to: enable a first profile in response to a first application of the wireless communication device being activated; operate the wireless transceiver in a discovery mode for use in establishing a first Wi-Fi P2P wireless network connection for the first application in accordance with one or more properties in the first profile; enable a second profile in response to a second application of the wireless communication device being activated; operate the wireless transceiver in a discovery mode for use in establishing a second Wi-Fi P2P wireless network connection for the second application in accordance with one or more properties in the second profile; and wherein the first profile and the second profile are enabled concurrently.

22. The wireless communication device of claim 21, wherein the one or more processors are further configured to: filter the received information to provide the first filtered information associated with one or more devices having a device type that matches the first device type property from the first profile and a service type that matches a first service type property from the first profile; and filter the received information to provide the second filtered information associated with one or more devices having a device type that matches the second device type property from the second profile and a service type that matches a second service type property from the second profile.

23. The wireless communication device of claim 21, wherein the discovery is performed for both the first and the second application at the same or substantially the same time.

* * * * *